(12) United States Patent
Han et al.

(10) Patent No.: US 11,386,396 B2
(45) Date of Patent: Jul. 12, 2022

(54) METHOD, APPARATUS AND COMPUTER PROGRAM PRODUCT FOR PROVIDING A CHANNEL CALENDAR IN A GROUP-BASED COMMUNICATION SYSTEM

(71) Applicant: Slack Technologies, Inc., San Francisco, CA (US)

(72) Inventors: Lydia Han, San Francisco, CA (US); Roland Schemers, Woodside, CA (US)

(73) Assignee: Slack Technologies, LLC, San Francisco, CA (US)

( * ) Notice: Subject to any disclaimer, the term of this patent is extended or adjusted under 35 U.S.C. 154(b) by 206 days.

(21) Appl. No.: 16/398,168

(22) Filed: Apr. 29, 2019

(65) Prior Publication Data

US 2020/0342415 A1  Oct. 29, 2020

(51) Int. Cl.
*G06Q 10/06* (2012.01)
*G06Q 10/10* (2012.01)
*H04L 51/046* (2022.01)

(52) U.S. Cl.
CPC ....... *G06Q 10/1093* (2013.01); *G06Q 10/101* (2013.01); *H04L 51/046* (2013.01)

(58) Field of Classification Search
CPC .............................. G06Q 10/06; G06Q 10/10
USPC ......................................................... 705/7.18
See application file for complete search history.

(56) References Cited

U.S. PATENT DOCUMENTS

| | | | | |
|---|---|---|---|---|
| 2009/0292690 | A1* | 11/2009 | Culbert | G06Q 10/109 |
| 2011/0137700 | A1* | 6/2011 | Hamalainen | G06Q 10/109 |
| | | | | 705/7.18 |
| 2011/0137991 | A1 | 6/2011 | Russell | |
| 2012/0084286 | A1* | 4/2012 | Hubner | G06Q 10/1093 |
| | | | | 707/737 |
| 2014/0372162 | A1* | 12/2014 | Dhara | G06Q 10/1095 |
| | | | | 705/7.19 |
| 2015/0036928 | A1 | 2/2015 | Sheth et al. | |
| 2015/0058057 | A1* | 2/2015 | Egan | G06Q 10/1095 |
| | | | | 705/7.19 |
| 2015/0088784 | A1* | 3/2015 | Dhara | G06N 5/02 |
| | | | | 706/11 |
| 2015/0149544 | A1* | 5/2015 | Zhang | G06Q 10/109 |
| | | | | 709/204 |
| 2016/0140508 | A1* | 5/2016 | Ossia | G06Q 10/1095 |
| | | | | 705/7.19 |

(Continued)

OTHER PUBLICATIONS

Matsumoto, T. et al., "Chocoa Communicator—A New Communication System Based on Awareness and Text Communications—", FUJITSU Sci. Tech J., 36, 2, (Dec. 2000) 154-161.

(Continued)

*Primary Examiner* — Nga B Nguyen
(74) *Attorney, Agent, or Firm* — Erise IP, P.A.

(57) ABSTRACT

Method, apparatus and computer program product for generating a channel calendar in a group-based communication system are described herein. The apparatus is configured to at least generate a channel calendar identifier associated with a group-based communication channel in the group-based communication system, receive a calendar sharing request associated with the channel calendar identifier from a client device, retrieve the calendar object and calendar object metadata set based on the channel calendar identifier, and cause rendering of the calendar object for display via a user interface of the client device.

20 Claims, 19 Drawing Sheets

(56) References Cited

U.S. PATENT DOCUMENTS

| | | | |
|---|---|---|---|
| 2016/0344679 | A1 | 11/2016 | Lane et al. |
| 2017/0116581 | A1* | 4/2017 | Shah .................. G06Q 10/1097 |
| 2017/0147202 | A1 | 5/2017 | Donohue |
| 2017/0244805 | A1* | 8/2017 | Callies .................... H04L 51/32 |
| 2017/0300868 | A1* | 10/2017 | Johnson ........... G06Q 10/06314 |
| 2018/0107342 | A1 | 4/2018 | Deets, Jr. |
| 2018/0287982 | A1 | 10/2018 | Draeger et al. |

OTHER PUBLICATIONS

The Big Pivot w/ Slack's Stewart Butterfield, Masters of Scale Podcast, Episode 13 (Aired Nov. 14, 2017), https://mastersofscale.com/#/stewart-butterfield-the-big-pivot/, (dated Jan. 17, 2018) 27 pages.

Robert Hof, "Stewart Butterfield On How Slack Became A $2.8 Billion Unicorn", FORBES, [online][retrieved May 9, 2019], Retrieved from the Internet: <URL:https://www.forbes.com/sites/roberthof/2015/06/02/stewart-butterfield-on-how-slack-became-a-2-8-billion-unicorn-2/#7c31937d7d9c>. (dated Jun. 2, 2015, 3;25 PM), 3 pages.

Rebecca Walberg, "Email biggest office waste of time: survey", National Post, At FP10, Lexisnexis, https://advance.lexis.com/api/permalink/96268e3f-26ad-48ac-a98f-6c39804ebded/?context=1000516, (dated Mar. 4, 2014) 2 pages.

Oikarinen, J. & Reed, D., "Internet Relay Chat Protocol", Request for Comments: 1459, Network Working Group, [online][retrieved May 30, 2019]. Retrieved from the Internet: <URL: https://www.rfc-editor.org/rfc/rfc1459.txt>. (dated May 1993) 66 pages.

Mike Issac, "Slack, a Start-Up With an App to Foster Business Collaboration, Is Valued at $1.1 Billion", The New York Times Blogs (BITS), Lexisnexis, https://advance.lexis.com/api/permalink/3eb84b34-a8f9-4d7d-9573-89d9598a4963/?context=1000516>. (dated Oct. 31, 2014) 2 pages.

Michael Carney, "Slack is thriving on a cocktail of whimsy and great timing", Pandodaily, Lexisnexis, https://advance.lexis.com/api/permalink/dd2d4ee5-2ddf-4d3a-a1d9-3bcee5e38b74/?context=1000516, (dated Feb. 6, 2015, 2:12 AM) 3 pages.

Matthew Ingram, "Flickr co-founder launches Slack, an all-in-one messaging tool designed to kill email forever", GIGAOM, Lexisnexis, https://advance.lexis.com/api/permalink/0b676b7c-aec3-4560-861e-d030d1dd008c/?context=1000516, (dated Feb. 12, 2014, 7:03 PM), 2 pages.

Jonathan Vanian, "Why these startups think chat apps are the next big thing in workplace collaboration", GIGAOM, Lexisnexis, https://advance.lexis.com/api/permalink/e83778c8-09c8-43aa-9ba0-88526283de69/?context=1000516, (dated Aug. 1, 2014, 5:45 PM) 4 pages.

Internet Relay Chat, WIKIPEDIA, , [online][retrieved May 30, 2019]. Retrieved from the Internet: <URL:https://en.wikipedia.org/wiki/Internet_Relay_Chat>. (dated May 28, 2019) 17 pages.

Ernie Smith, "Picking Up The Slack", TEDIUM, [online][retrieved May 9, 2019]. Retrieved from the Internet: <URL:https://tedium.co/2017/10/17/irc-vs-slack-chat-history/>. (dated Oct. 17, 2017) 8 pages.

David Auberbach, "Re-Animator. How Stewart Butterfield created Flickr and Slack out of the ashes of failed projects" [online][retrieved May 9, 2019]. Retrieved from the Internet: <URL:https://slate.com/business/2014/05/stewart-butterfield-flickr-and-slack-how-he-snatched-victory-from-the-jaws-of-defeat.html>. (dated May 28, 2014, 2:48 PM) 8 pages.

Adrienne LaFrance, "The Triumph of Email", Atlantic Online, Lexisnexis, https://advance.lexis.com/api/permalink/32d7ddd9-d4c1-4a73-86f7-08ab5842fde6/?context=1000516, (dated Jan. 6, 2016) 5 pages.

"How Slack changed the way we work by putting the customer experience first", Repeat Customer Podcast, Episode 3, [online][retrieved May 9, 2019], Retrieved from the Internet: <URL:https://www.zendesk.com/resources/slack-customer-experience/, (2019) 13 pages.

"Die, Email, Die! A Flickr Cofounder Aims To Cut Us All Some Slack", Readwriteweb, Lexisnexis, https://advance.lexis.com/api/permalink/33dd79e2-90f5-409d-ae27-5a2c7e86bf31/?context=1000516>. (dated Aug. 14, 2013, 4:15 PM) 2 pages.

\* cited by examiner

1500 — Tiny Dot

1501 — # infra-eng-team

July 2nd

Yup, because you can't necessary add them to the channel you're in. Through, we should throw a different message that says as much. If you have any thoughts, let me know and just bug me! NEW 1503 —
Adam Torres  12:00 PM ☆
Cool!

Andrew Schmidt  12:00 PM
Totally agree, I'll make the necessary changes and create a bug in JIRA for it.

Caitlyn Burke  12:00 PM
Uploaded a file
Singing & Dancing
30MB JPG

1505 — Message #design-team

FIG. 16

1600 — Channel details ☓

Topic
Elaborate passive aggressive metaphor as

EDIT  1601

Upcoming events

JIRA grooming and planning   [Join call]
Starting in 4mins at 10am
Lydia connected from company shared calendar Launch plans
1 - 1:30pm
Lydia connected from company shared calendar Infra share & tell  1603
Tomorrow, Nov 27, 2018, 2-3pm
Lydia connected from company shared calendar

VIEW ALL EVENTS

Actions

METHOD, APPARATUS AND COMPUTER PROGRAM PRODUCT FOR PROVIDING A CHANNEL CALENDAR IN A GROUP-BASED COMMUNICATION SYSTEM

BACKGROUND

Applicant has identified many deficiencies and problems associated with existing methods, apparatus, and systems related to electronic calendar services. For example, many calendar services fail to overcome technical challenges associated with sharing electronic calendars.

BRIEF SUMMARY

In general, embodiments of the present invention provide methods, apparatus, systems, computing devices, and/or the like for generating a channel calendar associated with a group-based communication channel in a group-based communication system.

In accordance with one aspect, an apparatus is provided. The apparatus comprises a processor and a non-transitory memory comprising program code. The non-transitory memory and the program code are configured to, with the processor, cause the apparatus to at least generate a channel calendar identifier associated with a group-based communication channel in a group-based communication system, receive, from a client device, a calendar sharing request associated with the channel calendar identifier, wherein the calendar sharing request comprises a request to access a calendar object from the group-based communication channel, wherein the calendar object comprises a calendar object metadata set, in response to receiving the calendar sharing request, retrieve the calendar object and the calendar object metadata set, and cause rendering of the calendar object for display via a user interface of the client device, wherein the user interface is associated with the group-based communication channel, wherein the rendering is based at least in part on the calendar object metadata set of the calendar object.

In accordance with another aspect, the calendar object is retrieved from a calendar object repository associated with an external calendar resource, wherein the channel calendar identifier is a channel email address associated with the external calendar resource.

In accordance with another aspect, the non-transitory memory and the program code are configured to, with the processor, cause the apparatus to further: receive an event generation request comprising a request for an event object and an event object metadata set, wherein the event object metadata set comprises an attendee parameter, wherein the attendee parameter comprises the channel email address, and cause rendering of the event object for display via the user interface associated with the group-based communication channel.

In accordance with another aspect, the client device is associated with a pre-shared calendar object in the group-based communication system.

In accordance with another aspect prior to receiving the calendar sharing request, the non-transitory memory and the program code are configured to, with the processor, cause the apparatus to generate a pre-shared calendar list, wherein the pre-shared calendar list comprises the pre-shared calendar object associated with the client device in the group-based communication system, wherein the calendar sharing request comprises an electronic selection of the pre-shared calendar object.

In accordance with another aspect, the pre-shared calendar object is associated with a pre-shared event object, wherein the non-transitory memory and the program code are configured to, with the processor, cause the apparatus to: generate a sharing link corresponding to the pre-shared event object, receive, via the user interface of the client device, an event sharing request associated with the sharing link, and cause rendering of the pre-shared event object for display via the user interface of the client device associated with the group-based communication channel.

In accordance with another aspect, the pre-shared event object is a recurring event object, wherein the sharing link comprises an electronic indication that the pre-shared event object is the recurring event object.

In accordance with another aspect, the calendar object is associated with an event object, wherein the event object comprises an event object metadata set, wherein the rendering is based further on the event object metadata set of the event object.

In accordance with another aspect, the event object metadata set comprises a visibility parameter, wherein the rendering is further based on the visibility parameter.

In accordance with another aspect, the visibility parameter is set to private. The non-transitory memory and the program code are configured to, with the processor, cause the apparatus to further: receive, from the client device, an event sharing request associated with the event object, and in response to receiving the event sharing request, transmit a warning notification to the client device.

In accordance with another aspect, a computer-implemented method is provided. The computer-implemented method comprises generating a channel calendar identifier associated with a group-based communication channel in a group-based communication system; receiving, from a client device, a calendar sharing request associated with the channel calendar identifier, wherein the calendar sharing request comprises a request to access a calendar object from the group-based communication channel, wherein the calendar object comprises a calendar object metadata set; in response to receiving the calendar sharing request, retrieving the calendar object and the calendar object metadata set; and causing rendering of the calendar object for display via a user interface of the client device, wherein the user interface is associated with the group-based communication channel, wherein the rendering is based at least in part on the calendar object metadata set of the calendar object.

In accordance with another aspect, a computer program product is provided. The computer program product comprises at least one non-transitory computer-readable storage medium having computer-readable program code portions stored therein. The computer-readable program code portions comprises an executable portion configured to: generate a channel calendar identifier associated with a group-based communication channel in a group-based communication system; receive, from a client device, a calendar sharing request associated with the channel calendar identifier, wherein the calendar sharing request comprises a request to access a calendar object from the group-based communication channel, wherein the calendar object comprises a calendar object metadata set; in response to receiving the calendar sharing request, retrieve the calendar object and the calendar object metadata set; and cause rendering of the calendar object for display via a user interface of the client device, wherein the user interface is associated with the group-based communication channel, wherein the rendering is based at least in part on the calendar object metadata set of the calendar object.

The above summary is provided merely for the purpose of summarizing some example embodiments to provide a basic understanding of some aspects of the disclosure. Accordingly, it will be appreciated that the above-described embodiments are merely examples and should not be construed to narrow the scope or spirit of the disclosure. It will be appreciated that the scope of the disclosure encompasses many potential embodiments in addition to those here summarized, some of which will be further described below.

BRIEF DESCRIPTION OF THE DRAWINGS

Figure 1:
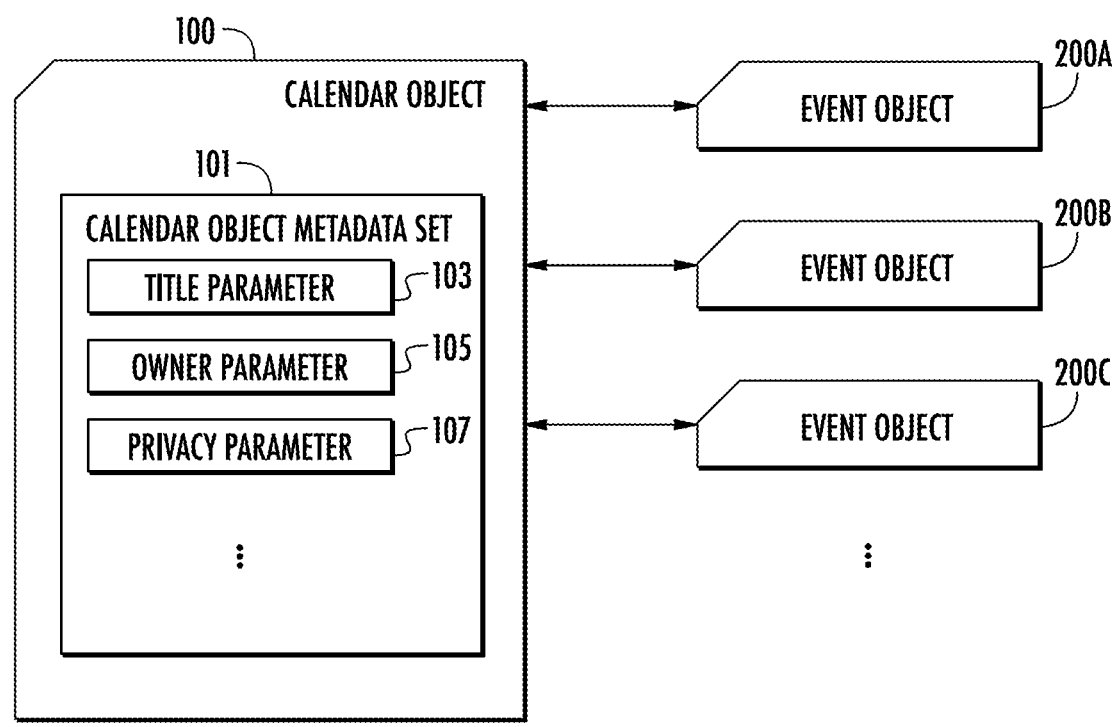
Figure 2:
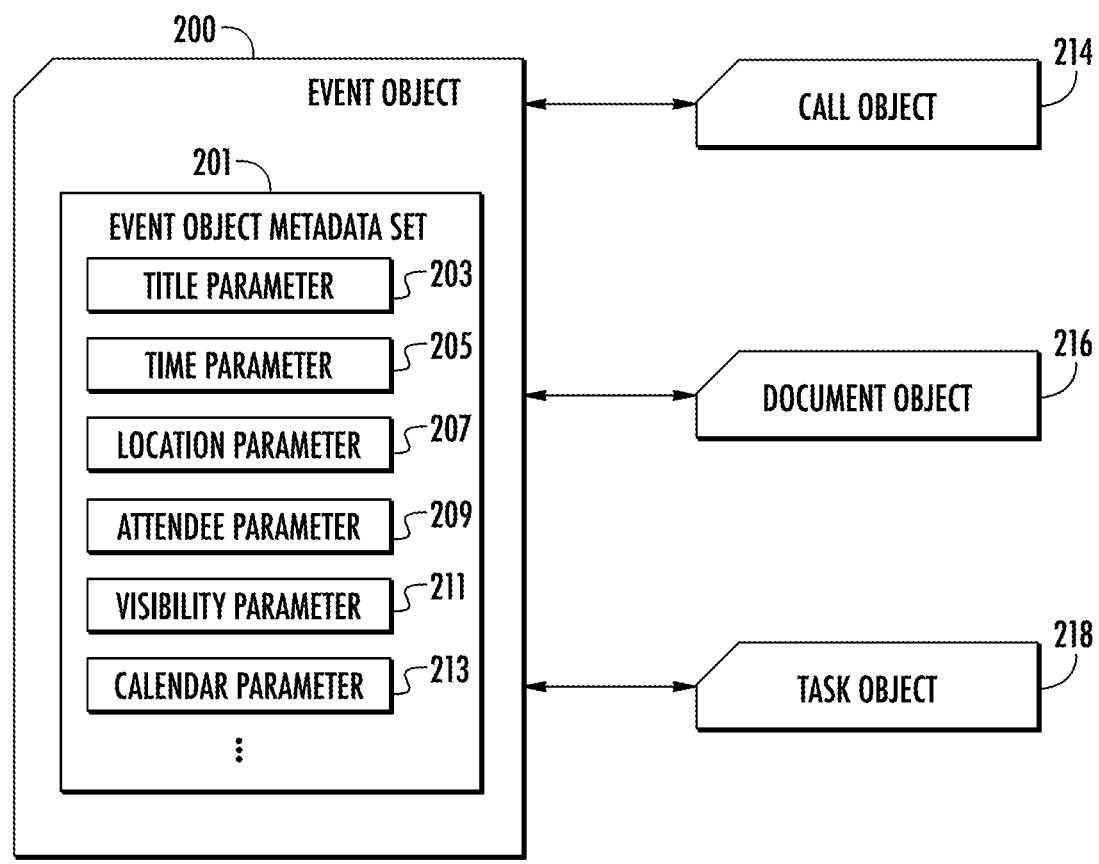
Figure 3:
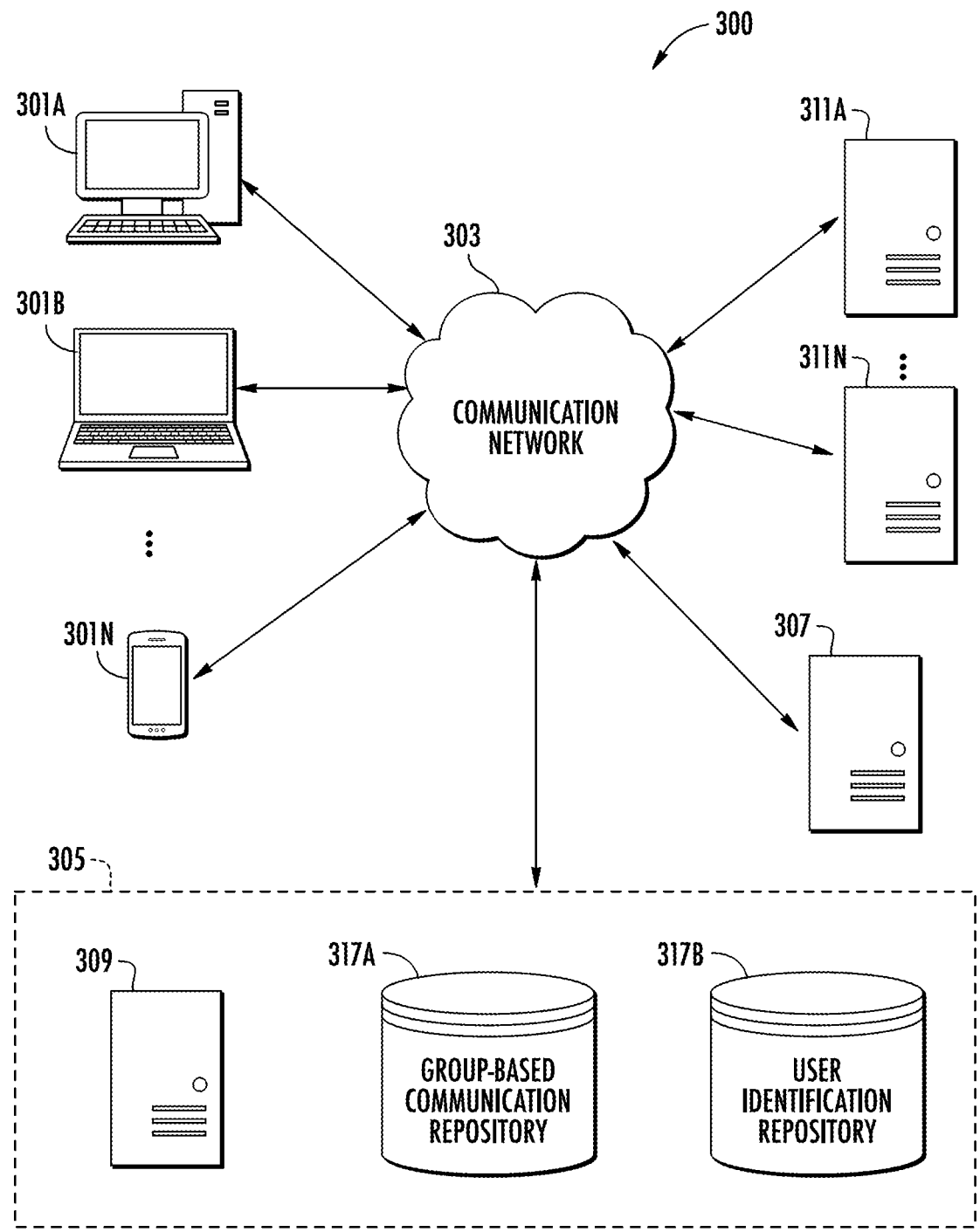
Figure 4:
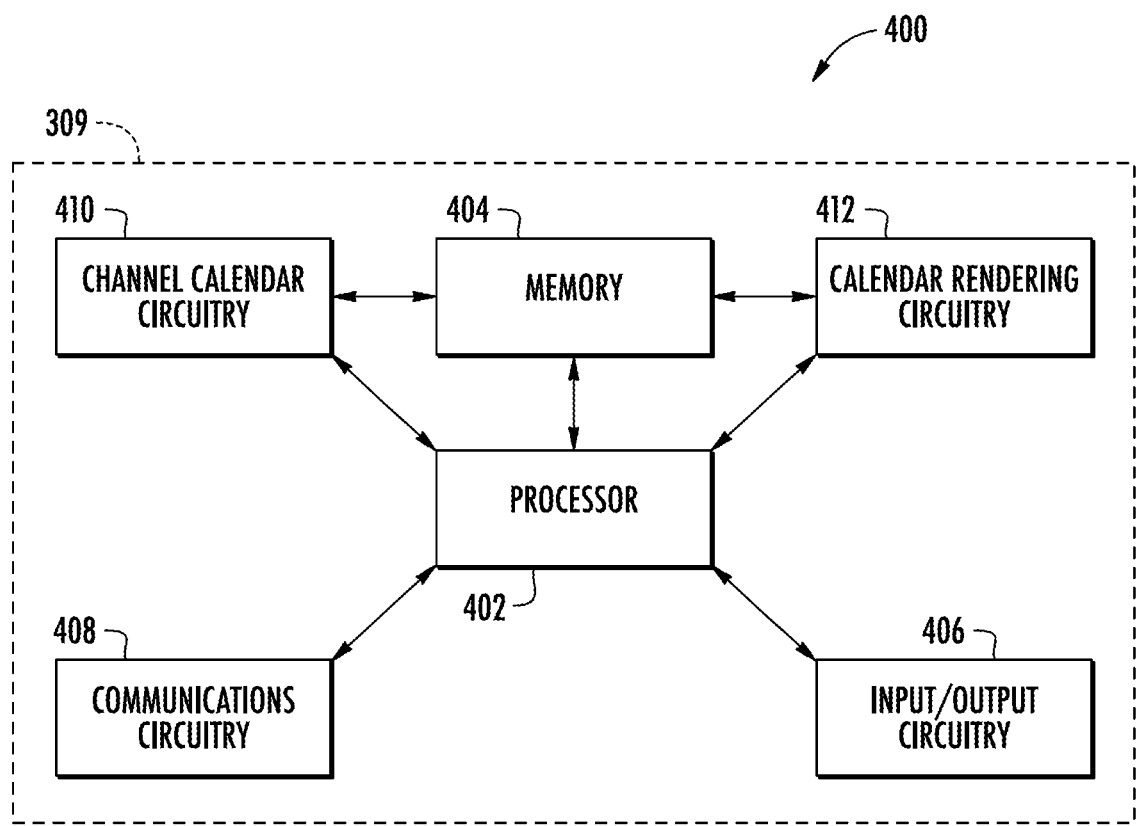
Figure 5:
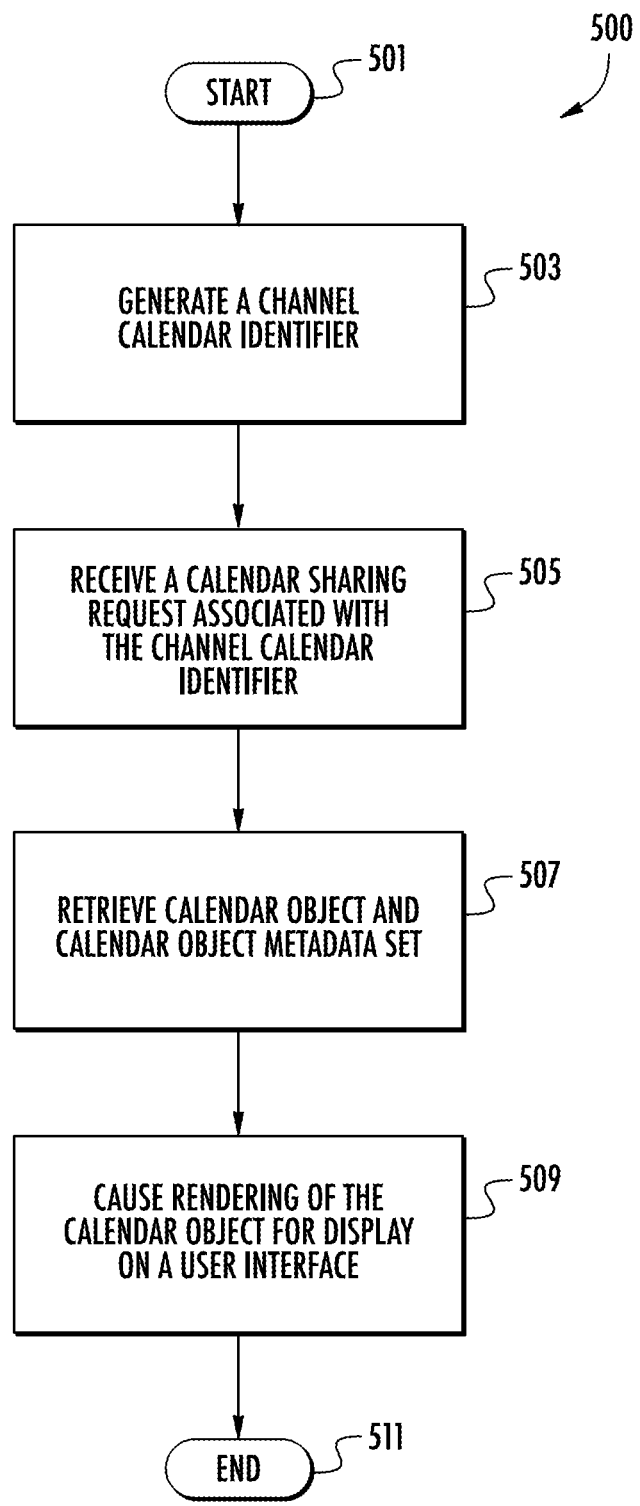
Figure 6:
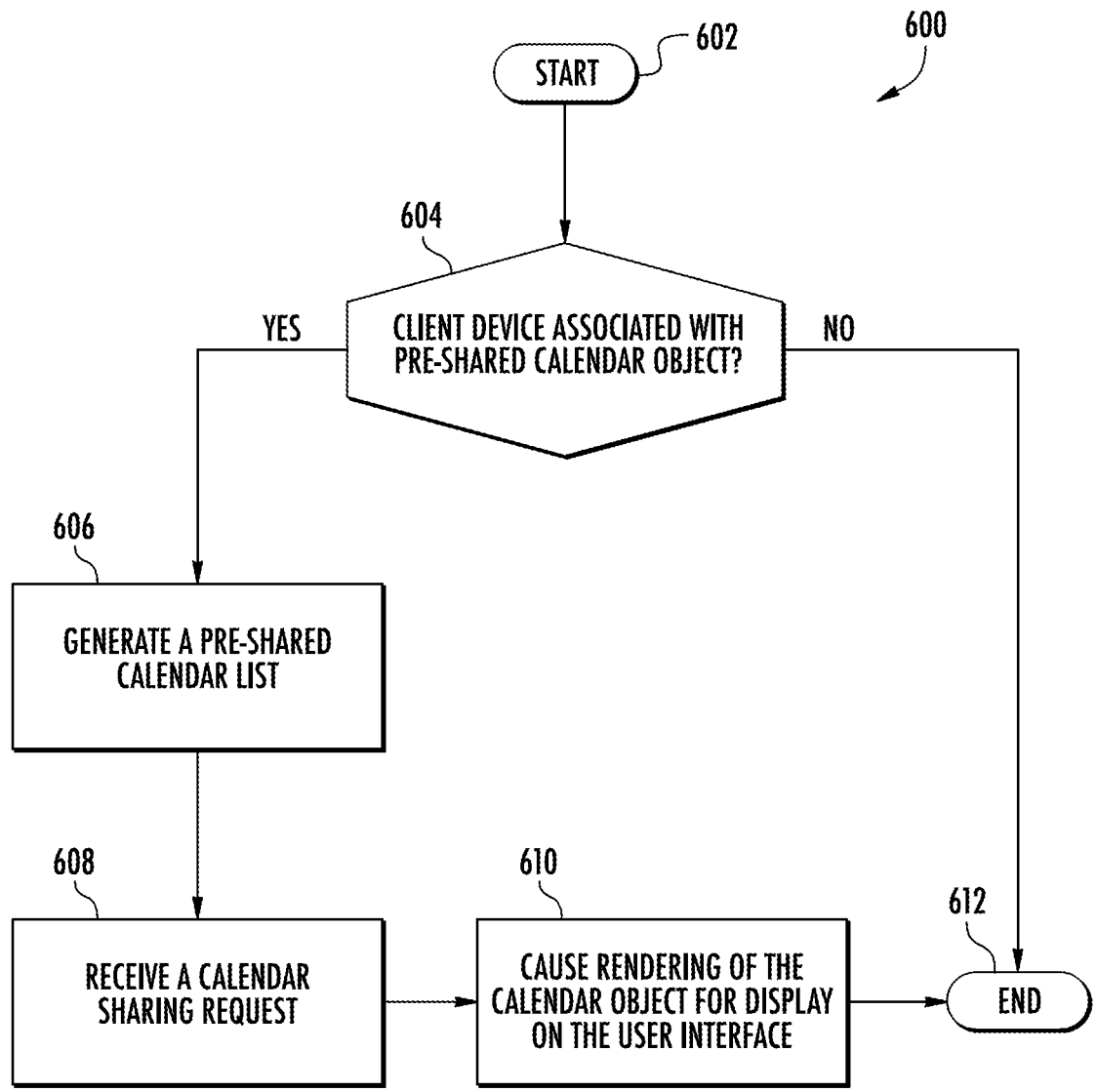
Figure 7:
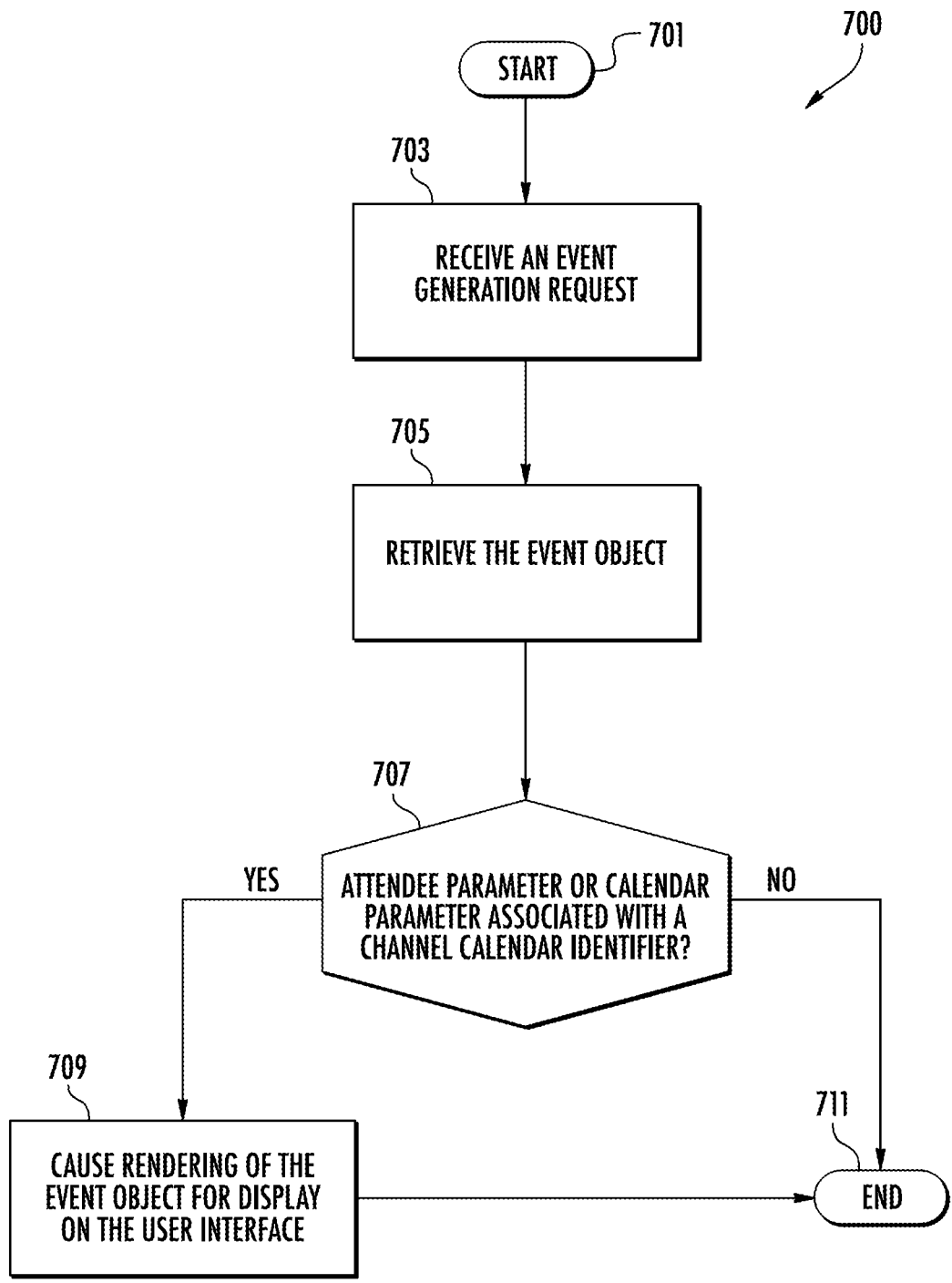
Figure 8:
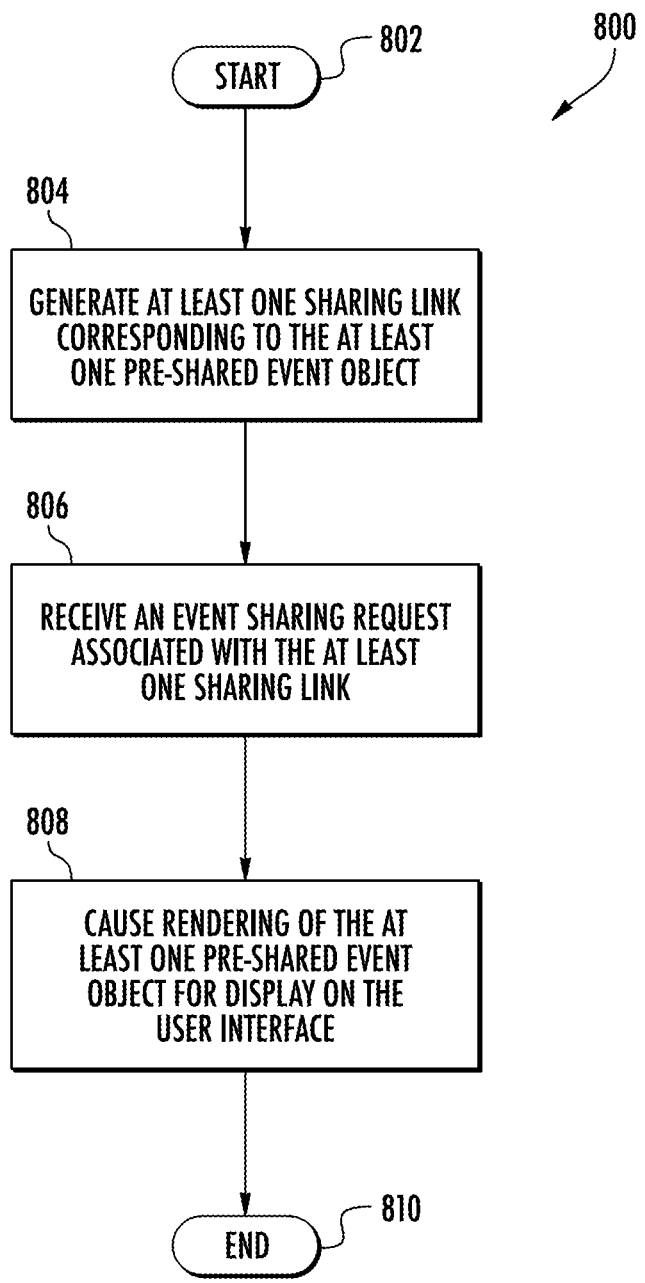
Figure 9:
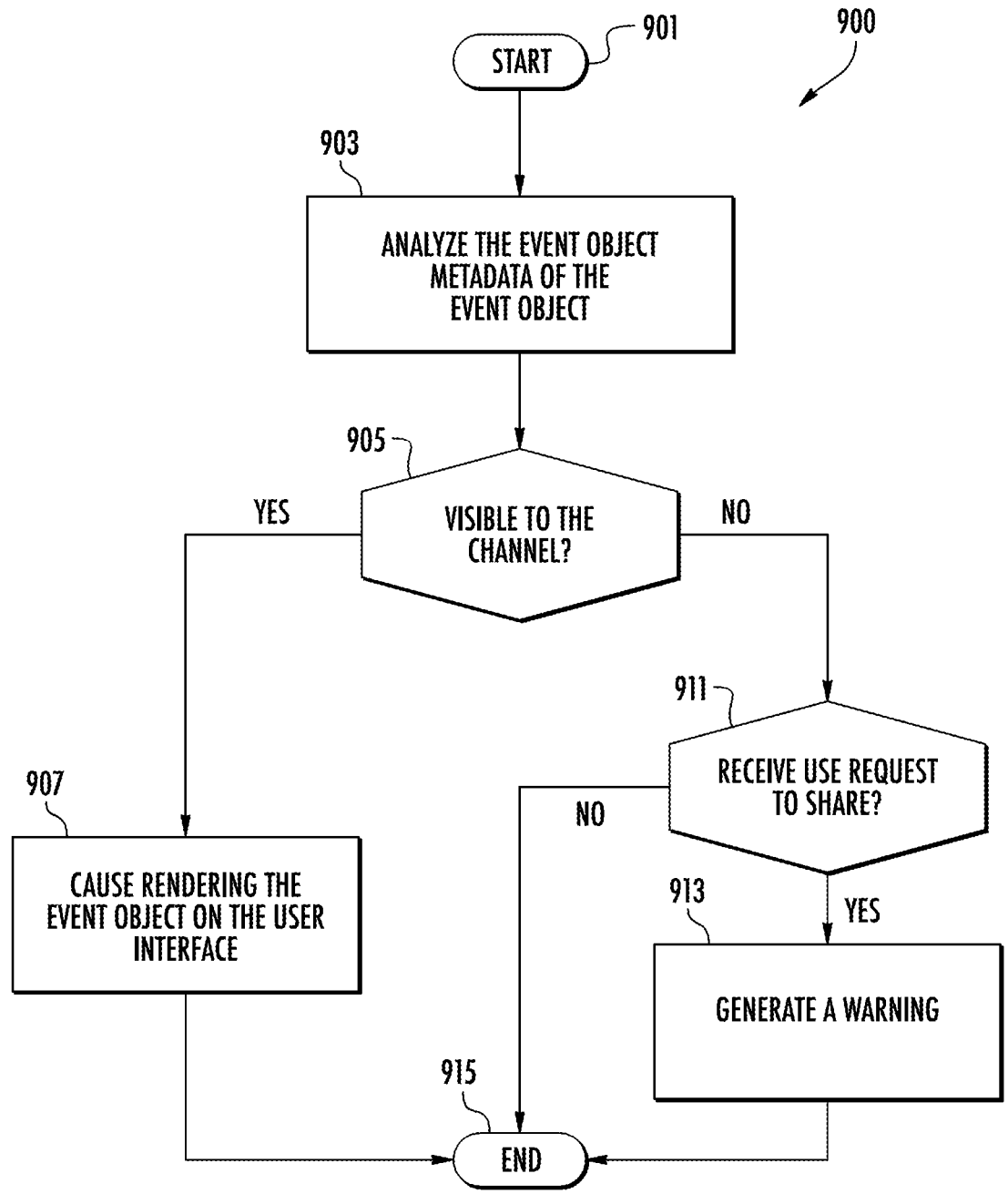
Figure 10:
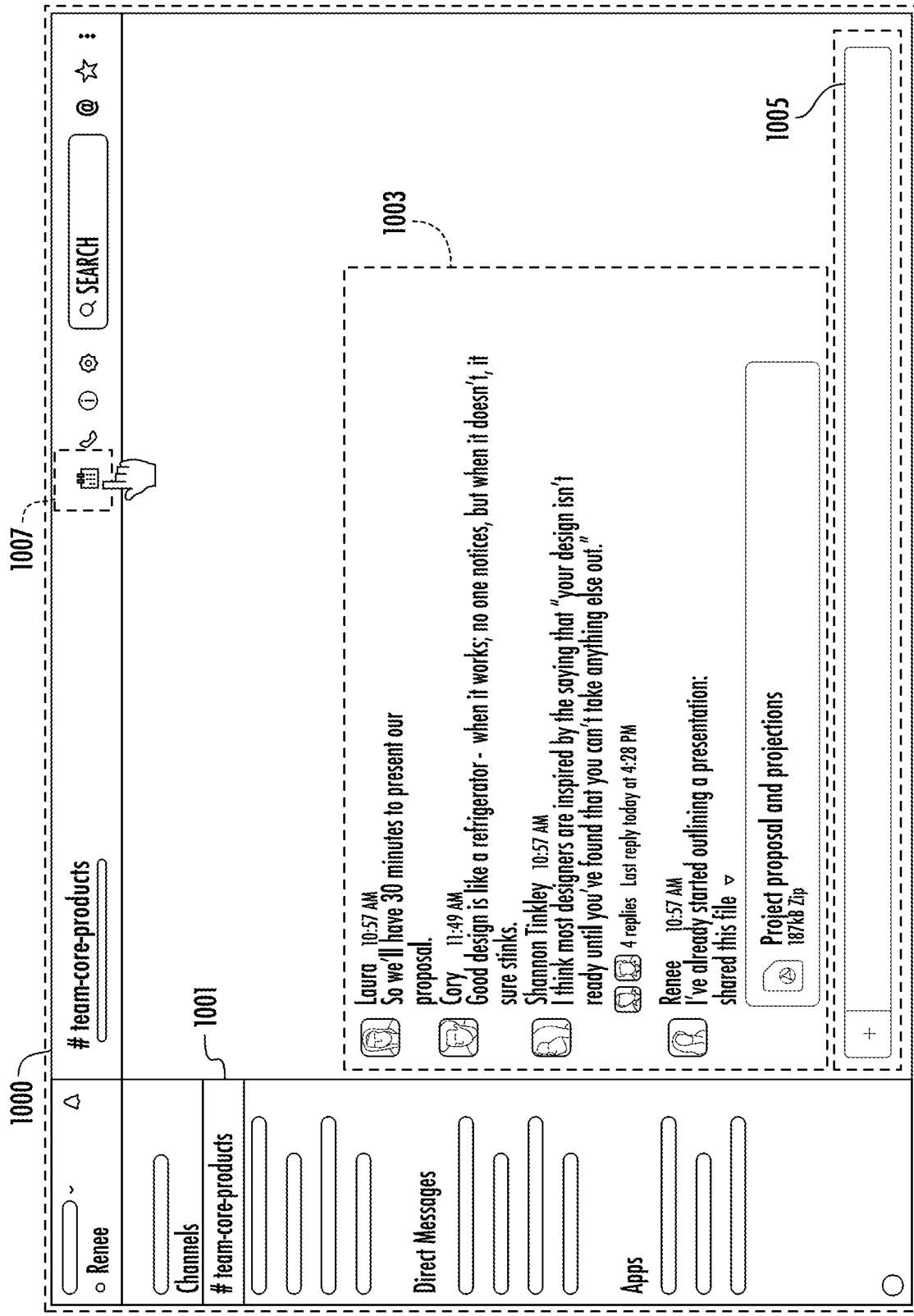
Figure 13:
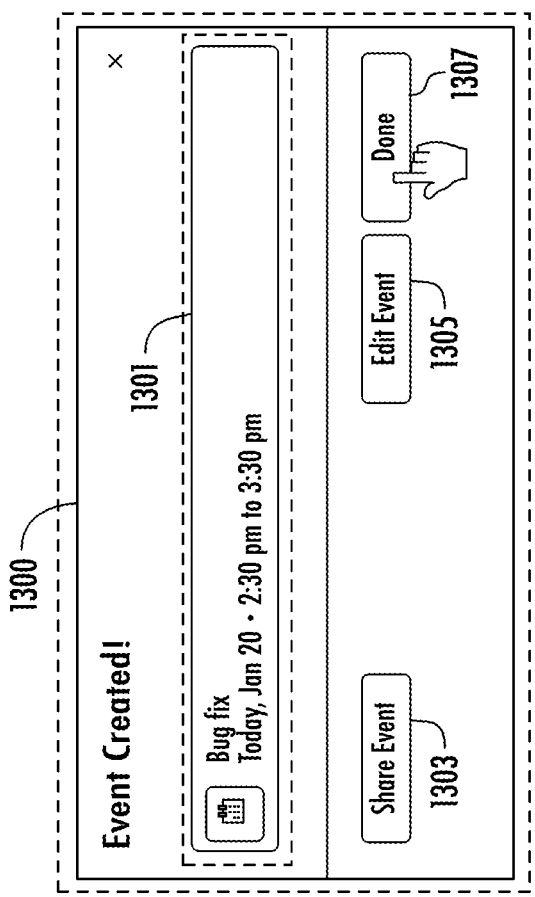
Figure 12:
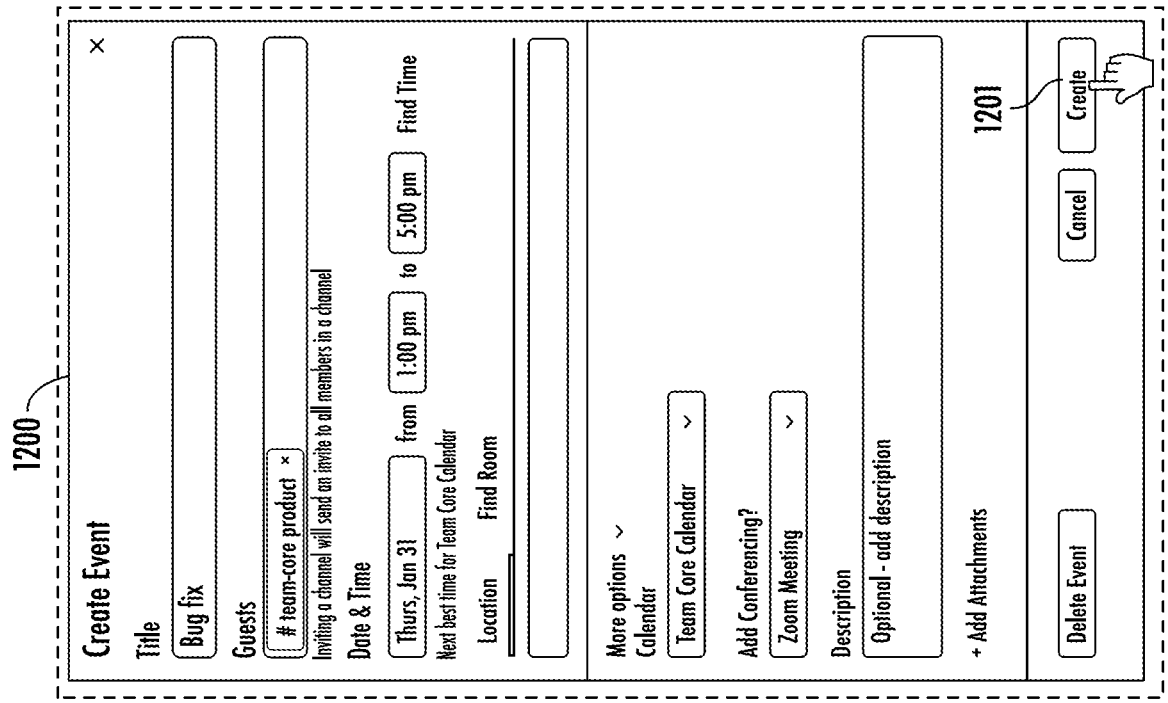
Figure 14:
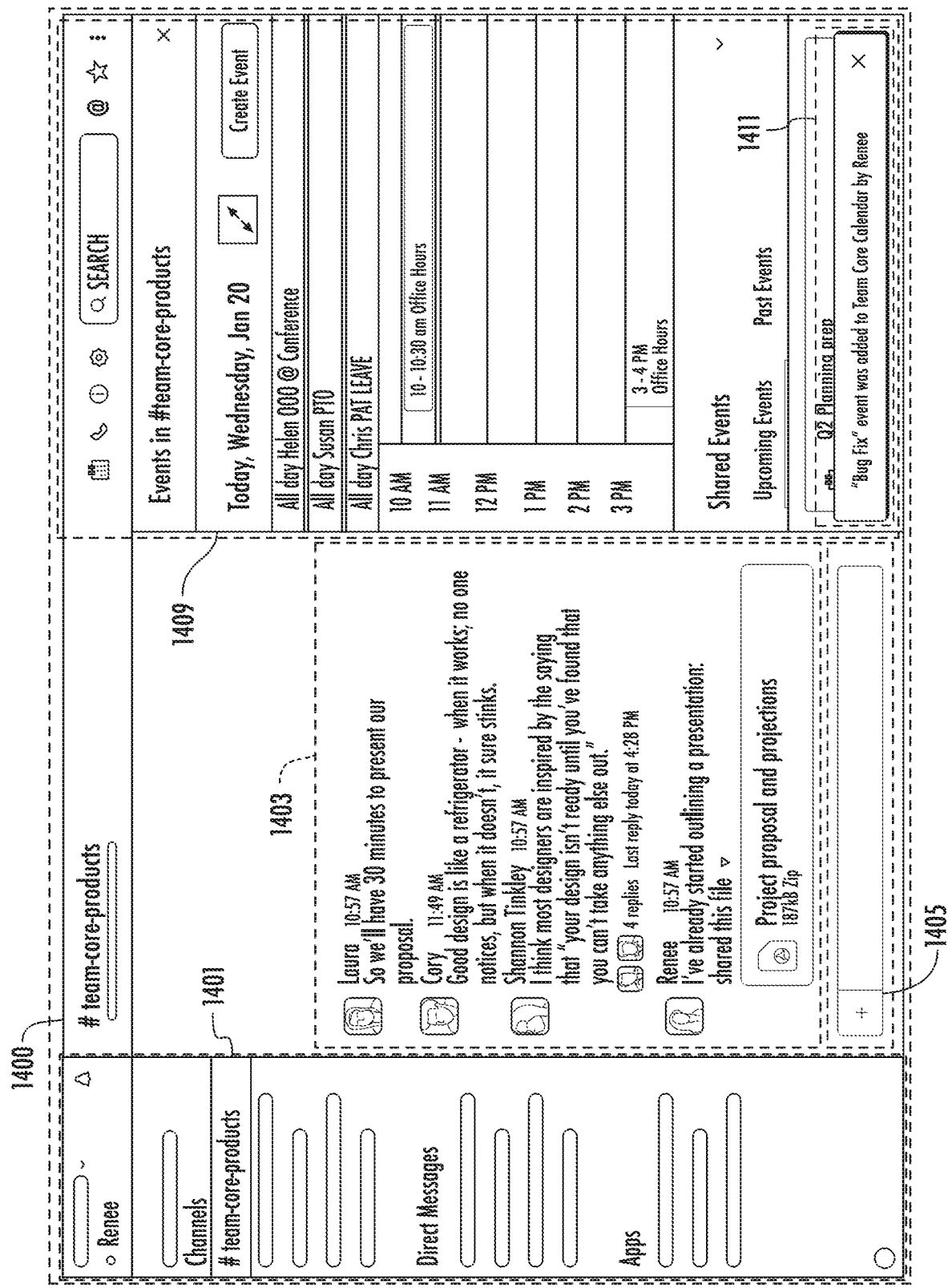
Figure 18:
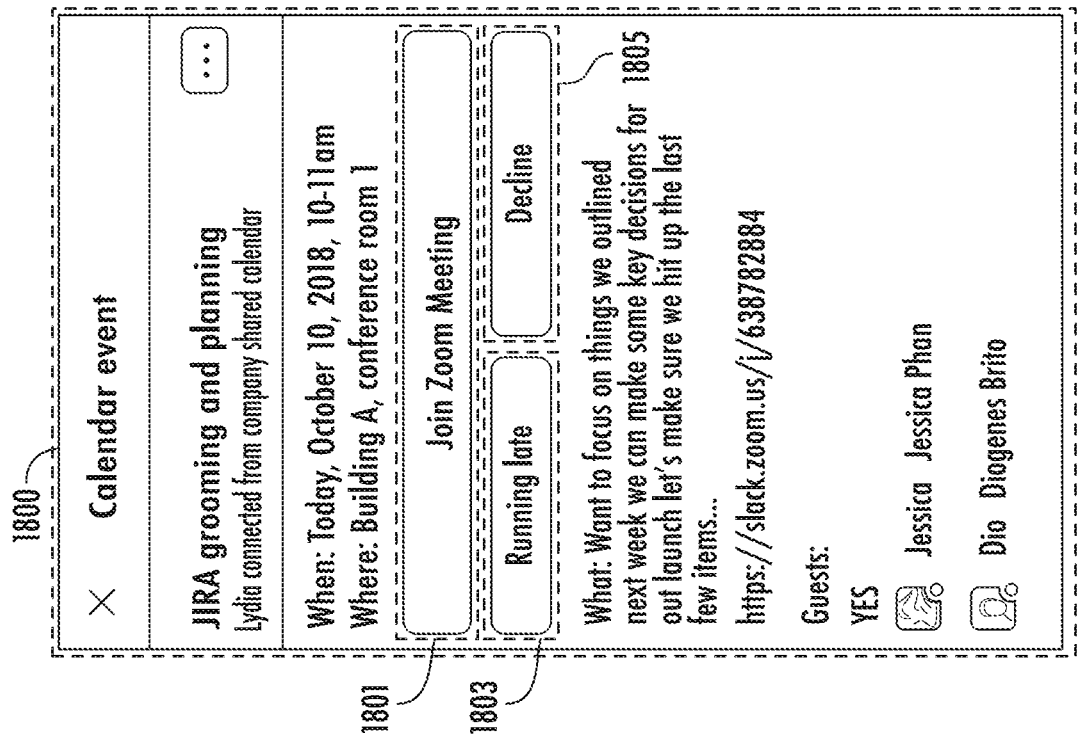
Figure 17:
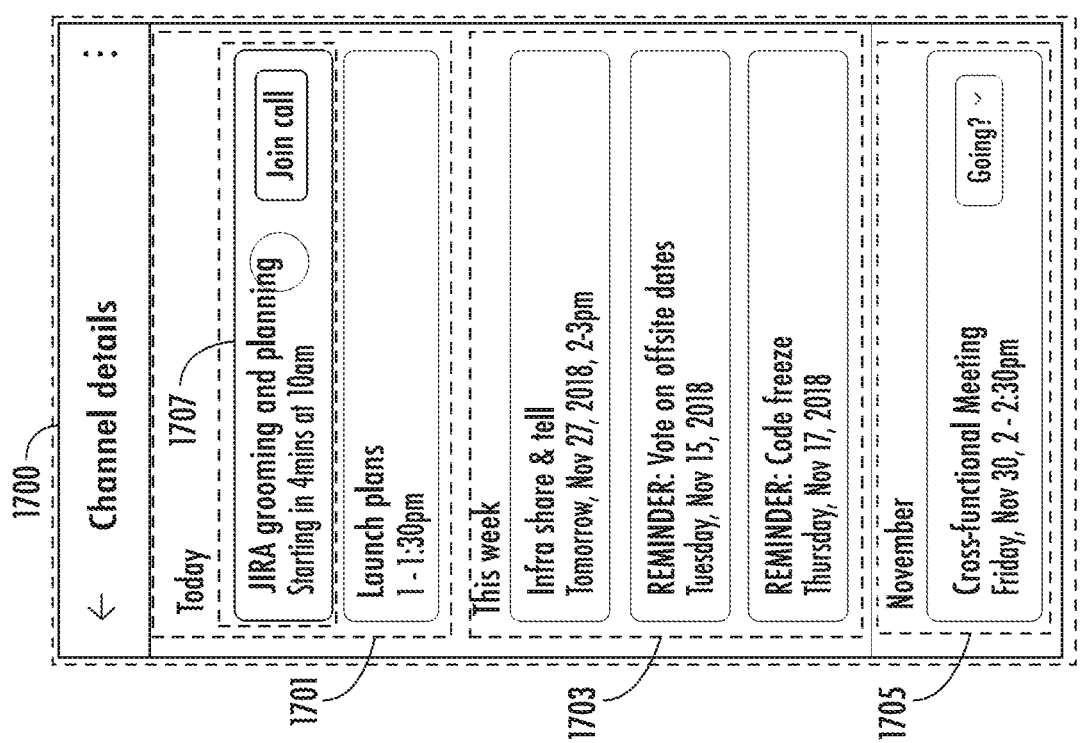
Figure 19:
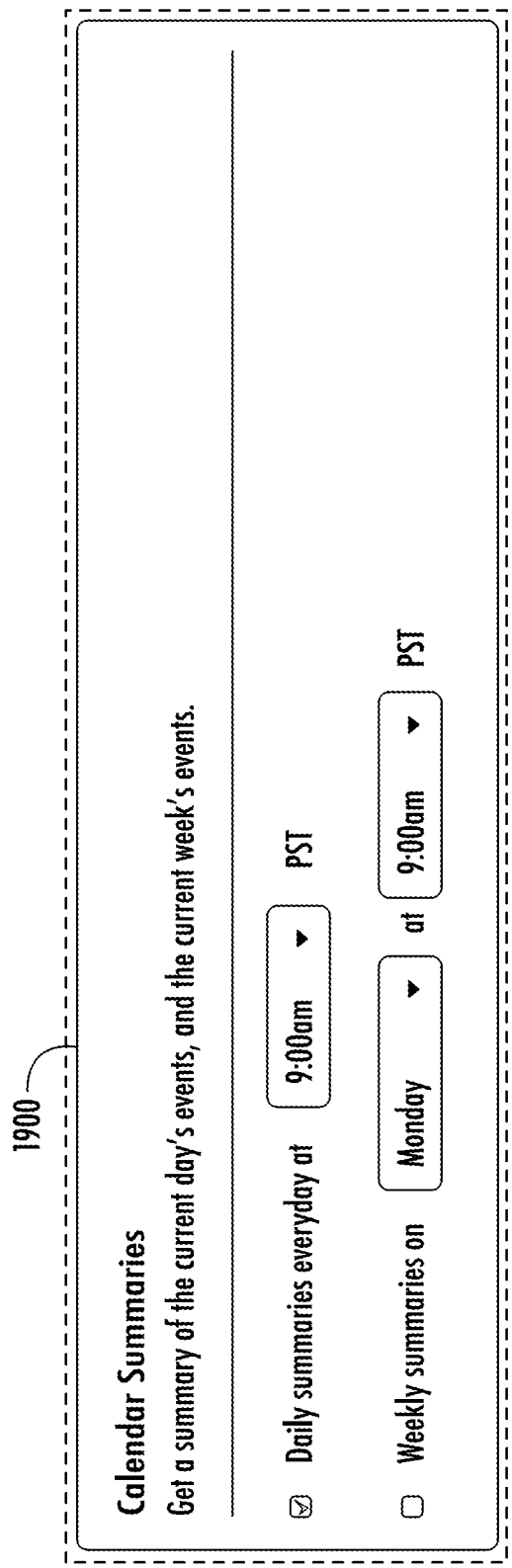
Figure 21:
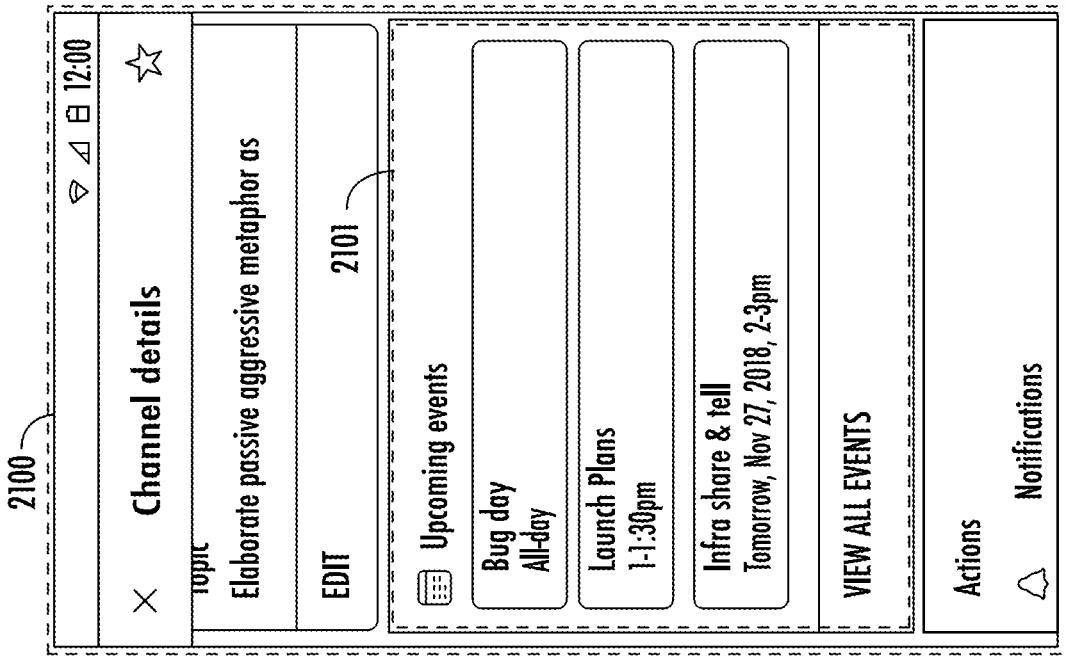
Figure 20:
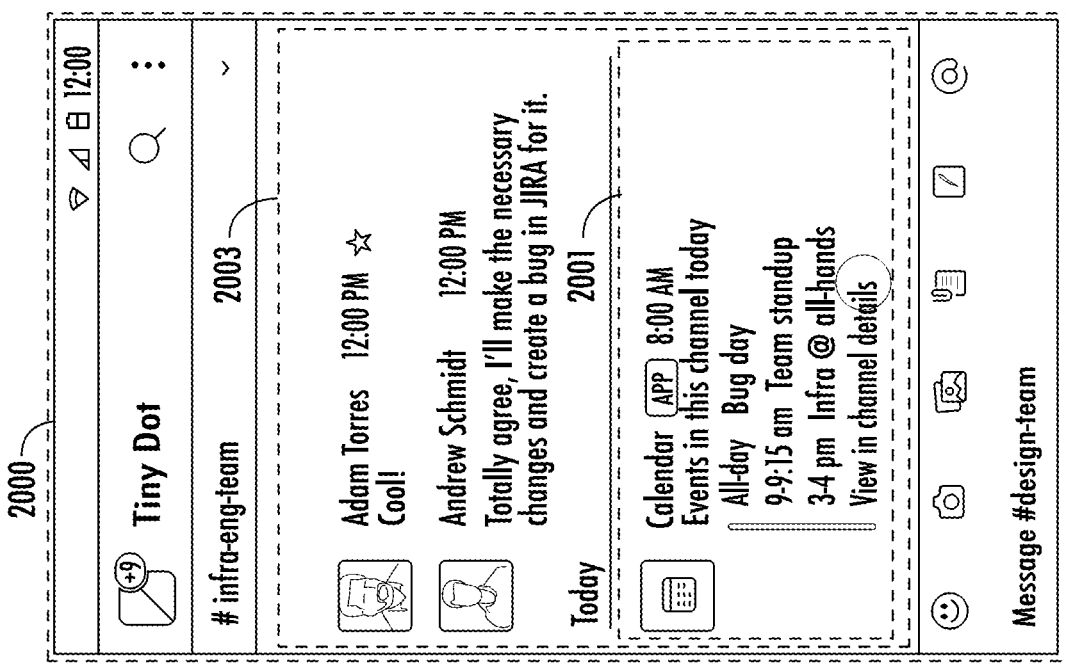
Figure 22:
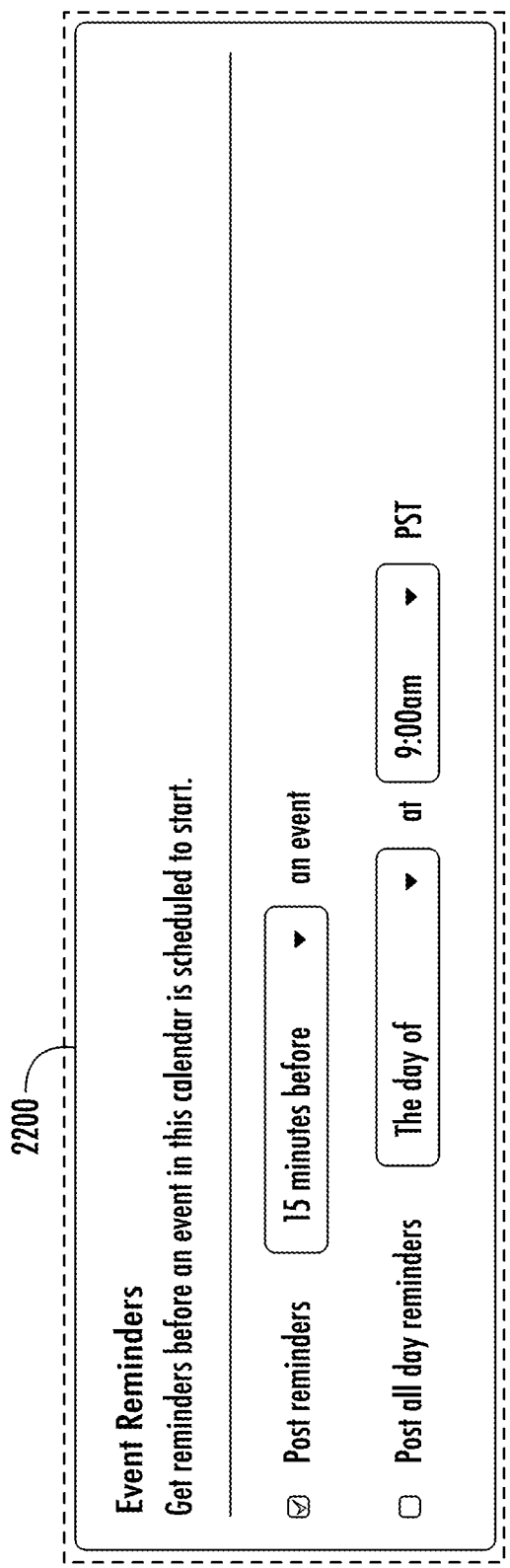
Figure 24:
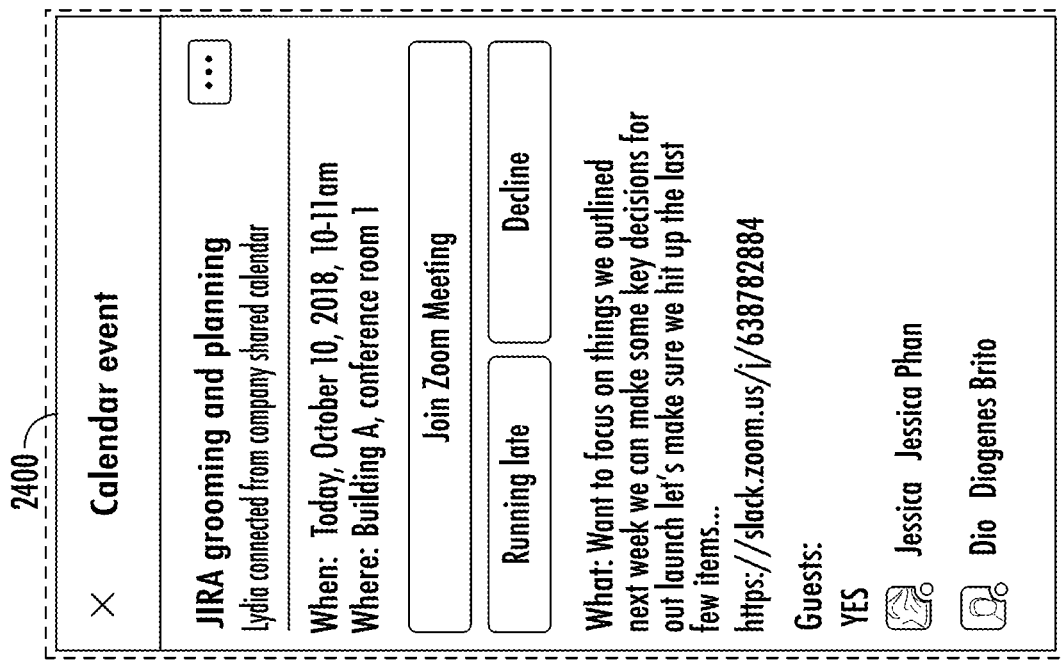
Figure 23:
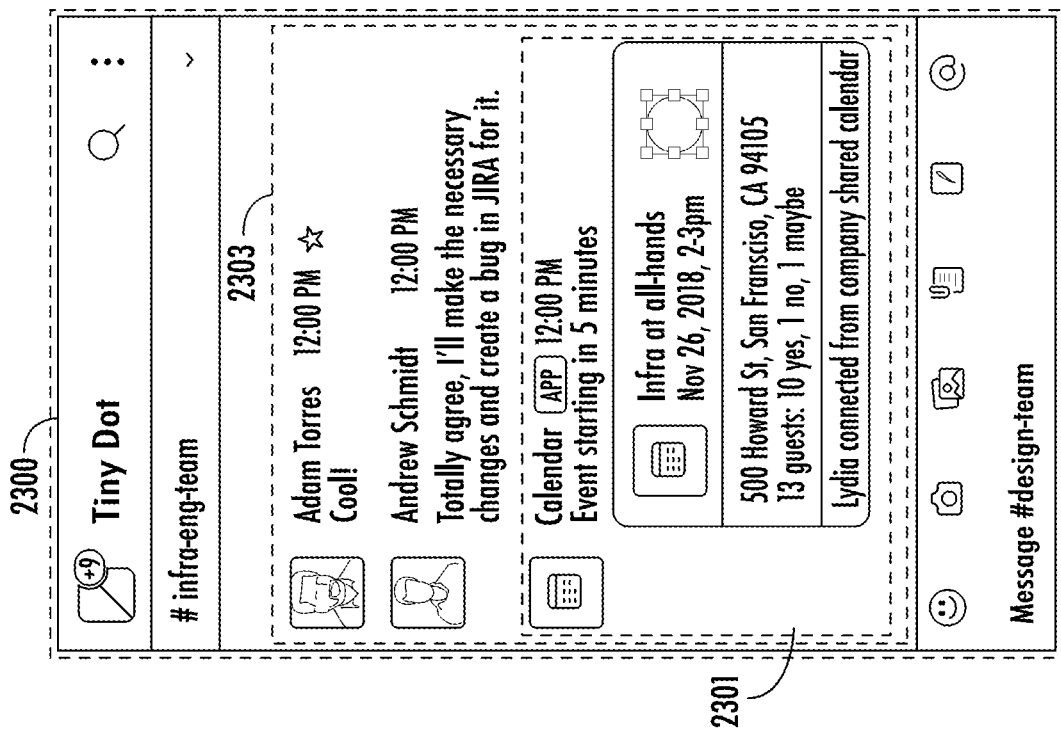

Having thus described some embodiments in general terms, references will now be made to the accompanying drawings, which are not necessarily drawn to scale, and wherein:

FIGS. 1 and 2 are example diagrams illustrating example data objects in accordance with some embodiments of the present disclosure;

FIG. 3 is an example system architecture diagram illustrating an example group-based communication system in communication with other devices in accordance with some embodiments of the present disclosure;

FIG. 4 is an example infrastructure diagram illustrating an example apparatus in accordance with embodiments of the present disclosure;

FIG. 5 is an example flowchart illustrating an example method in accordance with some embodiments of the present disclosure;

FIG. 6 is an example flowchart illustrating an example method in accordance with some embodiments of the present disclosure;

FIG. 7 is an example flowchart illustrating an example method in accordance with some embodiments of the present disclosure;

FIG. 8 is an example flowchart illustrating an example method in accordance with some embodiments of the present disclosure;

FIG. 9 is an example flowchart illustrating an example method in accordance with some embodiments of the present disclosure;

FIG. 10 illustrates various elements of an example user interface in accordance with some embodiments of the present disclosure;

Figure 11:
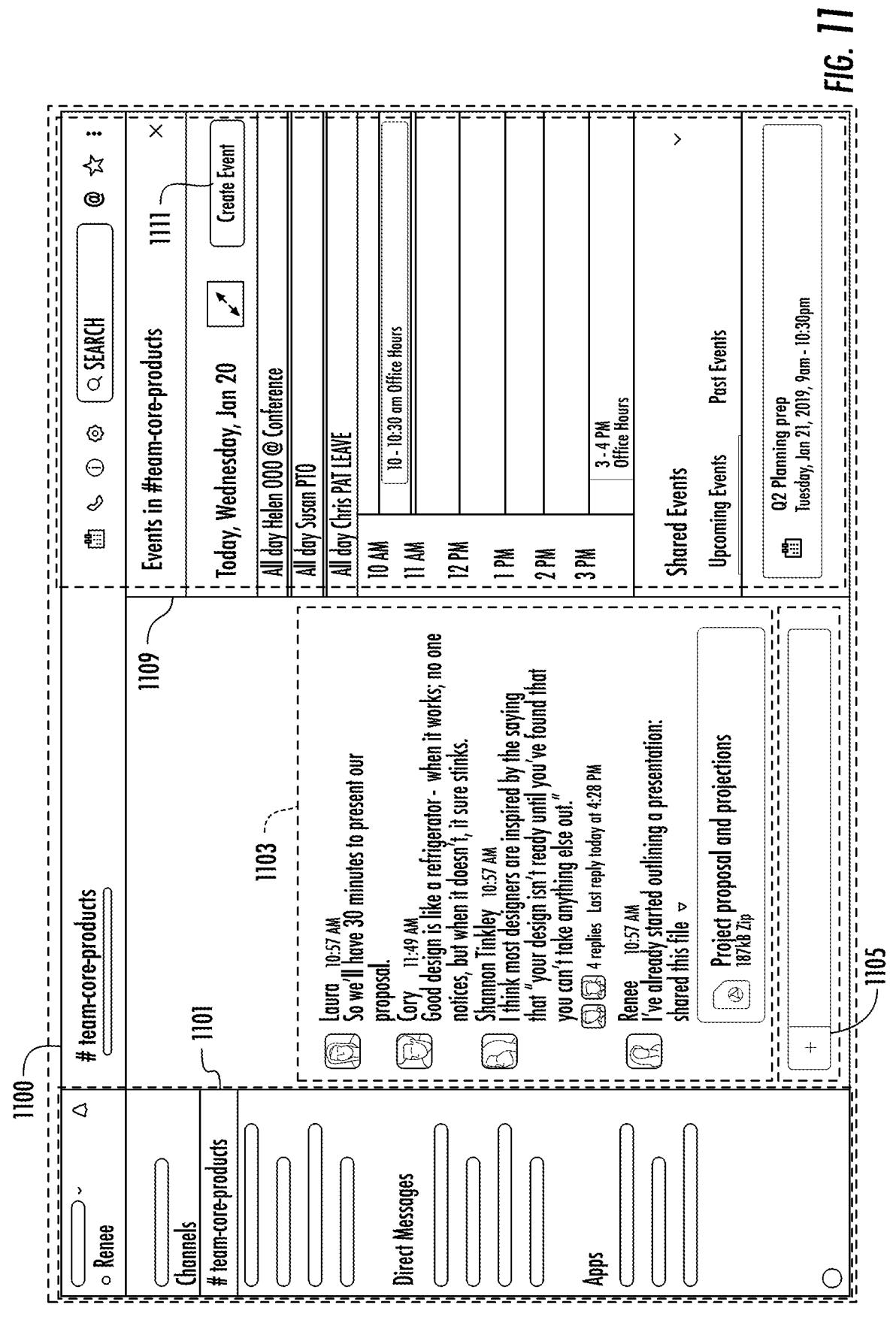

FIG. 11 illustrates various elements of an example user interface in accordance with some embodiments of the present disclosure;

FIG. 12 illustrates various elements of an example user interface in accordance with some embodiments of the present disclosure;

FIG. 13 illustrates various elements of an example user interface in accordance with some embodiments of the present disclosure;

FIG. 14 illustrates various elements of an example user interface in accordance with some embodiments of the present disclosure;

FIG. 15 illustrates various elements of an example user interface in accordance with some embodiments of the present disclosure;

FIG. 16 illustrates various elements of an example user interface in accordance with some embodiments of the present disclosure;

FIG. 17 illustrates various elements of an example user interface in accordance with some embodiments of the present disclosure;

FIG. 18 illustrates various elements of an example user interface in accordance with some embodiments of the present disclosure;

FIG. 19 illustrates various elements of an example user interface in accordance with some embodiments of the present disclosure;

FIG. 20 illustrates various elements of an example user interface in accordance with some embodiments of the present disclosure;

FIG. 21 illustrates various elements of an example user interface in accordance with some embodiments of the present disclosure;

FIG. 22 illustrates various elements of an example user interface in accordance with some embodiments of the present disclosure;

FIG. 23 illustrates various elements of an example user interface in accordance with some embodiments of the present disclosure; and FIG. 24 illustrates various elements of an example user interface in accordance with some embodiments of the present disclosure.

DETAILED DESCRIPTION OF VARIOUS EMBODIMENTS

Various embodiments of the present disclosure are described more fully hereinafter with reference to the accompanying drawings, in which some, but not all embodiments of the disclosure are shown. Indeed, the disclosure may be embodied in many different forms and should not be construed as limited to the embodiments set forth herein. Rather, these embodiments are provided so that this disclosure will satisfy applicable legal requirements. The term "or" is used herein in both the alternative and conjunctive sense, unless otherwise indicated. The terms "illustrative," "example," and "exemplary" are used to be examples with no indication of quality level. Like numbers refer to like elements throughout.

The term "comprising" means "including but not limited to," and should be interpreted in the manner it is typically used in the patent context. Use of broader terms such as "comprises," "includes," and "having" should be understood to provide support for narrower terms such as "consisting of," "consisting essentially of," and "comprised substantially of."

The phrases "in one embodiment," "according to one embodiment," "in some examples," and the like generally mean that the particular feature, structure, or characteristic following the phrase may be included in an embodiment of the present disclosure, and may be included in more than one embodiment of the present disclosure (importantly, such phrases do not necessarily refer to the same embodiment).

Overview

Various embodiments of the present disclosure relate generally to sharing and modifying electronic calendars and calendar events in network systems. More specifically, various embodiments of the present disclosure are related to generating a channel calendar in a group-based communication channel of a group-based communication system.

Challenges exist in electronically sharing calendars among a group of users. In order to generate a shared calendar, many calendar services require a group of users to use the same calendar service or platform. For example, if a user uses calendar resource(s) provided by Google® Calendar for his electronic calendar, calendar services fail to provide the technical capacity to allow the user to share his calendar with users who use calendar resources(s) provided by Microsoft Office®. As such, these calendar services increase redundancy in accessing calendars across different calendar services.

In addition, many calendar services fail to account for privacy settings of the events on a calendar after the calendar is shared among a group of users. For example, a user may share a calendar with other users, but one or more events on the calendar may be private (which should not be shared). Many calendar services fail to distinguish the event privacy from the calendar privacy, resulting in erroneous information sharing.

Moreover, many calendar services fail to provide information regarding shared calendars in an easy to access way. For example, on a calendar shared among a large group of users, many events may not be relevant to some of the users. As a result, many users may neglect to check the shared calendar, resulting in resource waste and inefficiency.

In contrast, systems structured in accordance with various embodiments of the disclosure provide specific, technical solutions to these technical problems faced by calendar services. For example, various embodiments of the disclosure allow a user to share a calendar object to a group-based communication channel, even if the calendar object is stored in an external calendar resource different from the calendar service(s) used by other members of the group-based communication channel. By doing so, the present disclosure reduces redundancy in sharing calendars, and reduces computer resource usage and network traffic congestion.

In addition, various embodiments of the present disclosure may determine whether to render an event object based on the visibility parameter of the event object metadata set, and may cause rendering of a warning message if a user requests to share a private event. Further, various embodiments of the present disclosure provide user interfaces that may present calendar summaries and event reminders of a channel calendar, enabling members of the channel to easily access important information associated with the channel.

As a result, various embodiments of the present disclosure reduce latency in calendar sharing, improve privacy protection, and reduce network resource usage, details of which are described hereinafter.

Definitions

As used herein, the terms "data," "content," "digital content," "digital content object," "information," and similar terms may be used interchangeably to refer to data capable of being transmitted, received, and/or stored in accordance with embodiments of the present disclosure. Thus, use of any such terms should not be taken to limit the spirit and scope of embodiments of the present disclosure. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like (sometimes referred to herein as a "network"). Similarly, where a computing device is described herein to send data to another computing device, it will be appreciated that the data may be sent directly to another computing device or may be sent indirectly via one or more intermediary computing devices, such as, for example, one or more servers, relays, routers, network access points, base stations, hosts, and/or the like.

In the present disclosure, the term "circuitry" should be understood broadly to include hardware and, in some embodiments, software for configuring the hardware. With respect to components of the apparatus, the term "circuitry" as used herein should therefore be understood to include particular hardware configured to perform the functions associated with the particular circuitry as described herein. For example, in some embodiments, "circuitry" may include processing circuitry, storage media, network interfaces, input/output devices, and the like.

"Group-based" is used herein to refer to a system, channel, message, or virtual environment that has security sufficient such that the system, channel, message, or virtual environment is accessible only to a defined group of users (e.g., users having a common group identifier associated with their respective user profiles). The group may be defined by common access credentials such as those of an organization or commercial enterprise. Access may further be facilitated by a validated request to join or an invitation to join transmitted by one group member user to another non-member user. Group identifiers (defined below) are used to associate data, information, messages, etc., with specific groups.

The term "group-based communication system" refers to a communications software platform and associated hardware that is configured to support and maintain a plurality of group-based communication interfaces and all associated functionality. Group-based communication system users are organized into organization groups (e.g., employees of different companies may be separate organization groups) and each group interacts with the platform via a respective group-based communication interface. For example, the group-based communication system might support, among others, a Slack Corporation group-based communication interface and an ACME Corporation group-based communication interface. Example group-based communication systems comprise supporting servers and client devices, and are further configured to engage external resources as defined below.

The term "group-based communication server" refers to a software platform and associated hardware that is configured to manage access to the various group-based communication interfaces (defined below) of the group-based communication system. The group-based communication server is configured to access, maintain, and support application product logic of the group-based communication system and to access one or more data repositories such as a group-based communication repository and a user identification repository.

The term "group-based communication channel" refers to a virtual communications environment or feed that is configured to display messaging communications posted by channel members (e.g., validated users accessing the environment using client devices) that are viewable only to the members of the group. The format of the group-based communication channel may appear differently to different members of the group-based communication channel; however, the content of the group-based communication channel (i.e., messaging communications) will be displayed to each member of the group-based communication channel. For instance, a common set of group-based messaging communications will be displayed to each member of the respective group-based communication channel such that the content of the group-based communication channel (i.e., messaging communications) will not vary per member of the group-based communication channel.

The term "user" should be understood to refer to an individual, group of individuals, business, organization, and the like. Users referred to herein are discussed largely in connection with client device enabled activity for accessing a group-based communication interface (or set of group-based communication interfaces) of a group-based communication system.

The terms "user profile," "user account," and "user account details" refer to data, files, and other information associated with a user, including, for example, a user identifier, one or more group-based communication channel identifiers (defined below) associated with group-based communication channels that the user has been granted access to, one or more group identifiers for groups with which the user is associated, an indication as to whether the user is an owner of any group-based communication channels, an indication as to whether the user has any group-based communication channel restrictions, a plurality of messages, a plurality of emojis, a plurality of conversations, a plurality of conversation topics, a graphical representation, an email address, a real name (e.g., John Doe), a username (e.g., jdoe), a password, a time zone, an external resource user identifier, avatar rendering settings, and the like. The user account details can include a subset designation of user credentials, such as, for example, login information for the user including the user's username and password.

In the present disclosure, the term "user identifier" refers to an identifier that uniquely identifies information stored in a group-based communication system that is related to a user. Information related to a user may be stored in a "user profile," "user account," or "user account details," which may include one or more group-based communication channel identifiers associated with group-based communication channels that the user has been granted access privileges to, one or more group identifiers for groups that the user has been granted access privileges to, an indication as to whether the user is an owner of any group-based communication channels, an indication as to whether the user has any group-based communication channel restrictions, a plurality of messages, a plurality of emoji, a plurality of conversations, a plurality of conversation topics, an avatar, an email address, a real name (e.g., John Doe), a username (e.g., jdoe), a password, a real name, a time zone, a status, and the like. The user account details can include a subset designation of user credentials, such as, for example, login information for the user including the user's username and password.

In the present disclosure, the term "client device" refers to computer hardware and/or software that is configured to access a service made available by a server. The server is often (but not always) on another computer system, in which case the client device accesses the service by way of a network. Client devices may include, without limitation, smart phones, tablet computers, laptop computers, wearables, personal computers, enterprise computers, and the like.

Group-based communication system users are organized into organization groups (e.g., employees of each company may be a separate organization group) and each organization group may have one or more group-based communication channels to which users may be assigned or which the users may join (e.g., group-based communication channels may represent departments, geographic locations such as offices, product lines, user interests, topics, issues, and/or the like). A group identifier is used to facilitate access control for a message (e.g., access to the message, such as having the message return as part of search results in response to a search query, may be restricted to those users having the group identifier associated with their user profile). The group identifier may be used to determine context for the message (e.g., a description of the group, such as the name of an organization and/or a brief description of the organization, may be associated with the group identifier).

Group-based communication system users may join group-based communication channels. Some group-based communication channels may be globally accessible to those users having a particular organizational group identifier associated with their user profile (i.e., users who are members of the organization). Access to some group-based communication channels may be restricted to members of specified groups, whereby the group-based communication channels are accessible to those users having a particular group identifier associated with their user profile. The group-based communication channel identifier may be used to facilitate access control for a message (e.g., access to the message, such as having the message return as part of search results in response to a search query, may be restricted to those users having the group-based communication channel identifier associated with their user profile, or who have the ability to join the group-based communication channel). The group-based communication channel identifier may be used to determine context for the message (e.g., a description of the group-based communication channel, such as a description of a project discussed in the group-based communication channel, may be associated with the group-based communication channel identifier).

The terms "group-based communication channel identifier" or "channel identifier" refer to one or more items of data by which a group-based communication channel may be uniquely identified by a group-based communication system. For example, a group-based communication channel identifier may comprise American Standard Code for Information Interchange (ASCII) text, a pointer, a memory address, and the like. In embodiments, a channel calendar according to the present disclosure may be associated with a group-based communication channel identifier.

The terms "group identifier" or "team identifier" refer to one or more items of data by which a group within a group-based communication system may be uniquely identified. For example, a group identifier may comprise ASCII text, a pointer, a memory address, and the like. In one embodiment, the group identifier associated with member users of a Slack Corporation workspace (i.e., a group-based communication interface) is 104356721.

The term "private group-based communication channel" refers to a group-based communication channel with restricted access such that it is not generally accessible and/or searchable by other members of the group-based communication system. For example, only those users or administrators who have knowledge of and permission to access (e.g., a group-based communication channel identifier for the private group-based communication channel is associated with their user profile after the user has been validated/authenticated) the private group-based communication channel may view content of the private group-based communication channel.

In the present disclosure, the terms "electronic message," "messaging communication," or "message" refer to electronically generated data object provided by a user using a client device and that is configured for display within a group-based communication channel. Message communications may include any text, image, video, audio or combination thereof provided by a user (using a client device). For instance, the user may provide a messaging communication that includes text as well as an image and a video within the messaging communication as message contents. In such a case, the text, image, and video would comprise the messaging communication or data object. Each message sent or posted to (i.e., transmitted for rendering within an interface of) a group-based communication channel of the group-based communication system includes metadata comprising the following: a sending user identifier, a message identifier, message contents, a group identifier, and a group-based communication channel identifier. Each of the foregoing identifiers may comprise ASCII text, a pointer, a memory address, and the like. For example, the following is an example programming code describing an electronic message, substantially in the form of a (Secure) Hypertext Transfer Protocol ("HTTP(S)") POST message including eXtensible Markup Language ("XML") formatted data:

```
POST /authrequest.php HTTP/1.1
Host: www.server.com
Content-Type: Application/XML
Content-Length: 667
<?XML version = "1.0" encoding = "UTF-8"?>
<auth_request>
    <timestamp>2020-12-31 23:59:59</timestamp>
    <user_accounts_details>
        <user_account_credentials>
            <user_name>ID_user_1</user_name>
            <password>abc123</password>
            //OPTIONAL <cookie>cookieID</cookie>
            //OPTIONAL
<digital_cert_link>www.mydigitalcertificate.com/
JohnDoeDaDoeDoe@gmail.com/mycertifcate.dc</digital_cert_link>
            //OPTIONAL
<digital_certificate>_DATA_</digital_certificate>
        </user_account_credentials>
    </user_accounts_details>
    <client_details> //iOS Client with App and Webkit
        <client_IP>10.0.0.123</client_IP>
        <user_agent_string>Mozilla/5.0 (iPhone; CPU iPhone OS 7_1_1 like Mac OS X) AppleWebKit/537.51.2 (KHTML, like Gecko) Version/7.0 Mobile/11D201 Safari/9537.53</user_agent_string>
        <client_product_type>iPhone6,1</client_product_type>
        <client_serial_number>DNXXX1X1XXXX</client_serial_number>
        <client_UDID>3XXXXXXXXXXXXXXXXXXXXXXXXD</client_UDID>
        <client_OS>iOS</client_OS>
        <client_OS_version>7.1.1</client_OS_version>
        <client_app_type>app with webkit</client_app_type>
        <app_installed_flag>true</app_installed_flag>
        <app_name>MSM.app</app_name>
        <app_version>1.0 </app_version>
        <app_webkit_name>Mobile Safari</app_webkit_name>
        <client_version>537.51.2</client_version>
    </client_details>
    <client_details> //iOS Client with Webbrowser
        <client_IP>10.0.0.123</client_IP>
        <user_agent_string>Mozilla/5.0 (iPhone; CPU iPhone OS 7_1_1 like Mac OS X) AppleWebKit/537.51.2 (KHTML, like Gecko) Version/7.0 Mobile/11D201 Safari/9537.53</user_agent_string>
        <client_product_type>iPhone6,1</client_product_type>
        <client_serial_number>DNXXX1X1XXXX</client_serial_number>
        <client_UDID>3XXXXXXXXXXXXXXXXXXXXXXXXD</client_UDID>
        <client_OS>iOS</client_OS>
        <client_OS_version>7.1.1</client_OS_version>
        <client_app_type>web browser</client_app_type>
        <client_name>Mobile Safari</client_name>
        <client_version>9537.53</client_version>
    </client_details>
    <client_details> //Android Client with Webbrowser
        <client_IP>10.0.0.123</client_IP>
        <user_agent_string>Mozilla/5.0 (Linux; U; Android 4.0.4;
en-us; Nexus S Build/IMM76D) AppleWebKit/534.30 (KHTML, like Gecko) Version/4.0 Mobile Safari/534.30</user_agent_string>
        <client_product_type>Nexus S</client_product_type>
        <client_serial_number>YXXXXXXXXZ</client_serial_number>
        <client_UDID>FXXXXXXXXX-XXXX-XXXX-XXXX-XXXXXXXXXXXXX</client_UDID>
        <client_OS>Android</client_OS>
        <client_OS_version>4.0.4</client_OS_version>
        <client_app_type>web browser</client_app_type>
        <client_name>Mobile Safari</client_name>
        <client_version>534.30</client_version>
    </client_details>
    <client_details> //Mac Desktop with Webbrowser
        <client_IP>10.0.0.123</client_IP>
        <user_agent_string>Mozilla/5.0 (Macintosh; Intel Mac OS X 10_9_3) AppleWebKit/537.75.14 (KHTML, like Gecko) Version/7.0.3 Safari/537.75.14</user_agent_string>
        <client_product_type>MacPro5,1</client_product_type>
        <client_serial_number>YXXXXXXXXZ</client_serial_number>
        <client_UDID>FXXXXXXXXX-XXXX-XXXX-XXXX-XXXXXXXXXXXXX</client_UDID>
        <client_OS>Mac OS X</client_OS>
        <client_OS_version>10.9.3</client_OS_version>
        <client_app_type>web browser</client_app_type>
        <client_name>Mobile Safari</client_name>
        <client_version>537.75.14</client_version>
    </client_details>
    <message>
        <sender_identifier>5541263684</sender_identifier>
        <message_identifier>ID_message_10</message_identifier>
        <team_identifier>ID_team_1</team_identifier>
        <channel_identifier>ID_channel_1</channel_identifier>
        <contents>That is an interesting invention. I have attached a copy of our patent policy.</contents>
        <attachments>patent_policy.pdf</attachments>
        <reaction>
            <sender_identifier>5541263684</sender_identifier>
            <reaction_identifier>5422</reaction_identifier>
        </reaction>
    </message>
</auth_request>
```

In the present disclosure, the term "data object" refers to a data structure that represents one or more functionalities and characteristics. For example, a "calendar object" is a data structure that represents an electronic calendar, and an "event object" is a data structure that represents an event. An event object may be associated with one or more calendar objects. Other data objects may include a "document object" (represents a computer file), a "workplace object" (describes the physical work environment (such as conference rooms in an office building) associated with the group-based communication system and/or the client devices in communication with the group-based communication system).

Each data object may contain a value or a group of values. Such values may include, for example, a "metadata" associated with the data object. The term "metadata" refers to a parameter that comprises an attribute of the data object. The term "metadata set" refers to a collective repository of metadata associated with the data object. For example, a calendar object may include a "calendar object metadata set," which may include parameters such as title parameter, owner parameter, visibility parameter, etc. As another example, an event object may include an "event object metadata set," and may include parameters such as title parameter, time parameter, location parameter, attendee parameter, visibility parameter, calendar parameter, details of which are described hereinafter.

Referring now to FIG. 1, an example calendar object 100 in accordance with example embodiments of the present disclosure is illustrated. As describe above, a calendar object represents an electronic calendar. As shown in FIG. 1, the calendar object 100 may include a calendar object metadata set 101, and the calendar object metadata set 101 may include, for example, a title parameter 103, an owner parameter 105, and a privacy parameter 107.

The title parameter 103 may be, for example, a text string that describes the title associated with the calendar (for example, "work calendar"). The owner parameter 105 may be, for example, a string of ASCII characters that identifies the owner of the calendar object. In some embodiments, the owner parameter 105 may be an email address. The privacy parameter 107 may comprise electronic indication(s) on, for example, whether the calendar object 100 represents a private calendar that is only accessible by the owner of the calendar object, or a public calendar that is accessible by people who are not the owner of the calendar object.

Further, the calendar object 100 may be connected with one or more event objects, such as event objects 200A, 200B, and 200C as shown in FIG. 1. Each of the event objects represents an event that is associated with the electronic calendar that is represented by the calendar object 100. For example, if the calendar object 100 represents a user's work calendar, the event objects 200A, 200B, and 200C may represent telephone conferences, meetings, and/or deadlines that are on the user's work calendar.

In the present disclosure, the term "channel calendar" refers to a calendar object that is accessible by members of a group-based communication channel (in other words, "shared" by members of the group-based communication channel). In particular, members of the group-based communication channel are able to view and edit the channel calendar. In some examples, the channel calendar may be generated by an external calendar resource. In some examples, the channel calendar may be generated by the group-based communication system. In accordance with various embodiments, the channel calendar may be rendered for display via a user interface associated with the group-based communication channel. Example methods, apparatus, and systems for generating and displaying a channel calendar are provided in detail in the present disclosure.

Referring now to FIG. 2, an example event object 200 in accordance with example embodiments of the present disclosure is illustrated. As shown in FIG. 2, the event object 200 may include an event object metadata set 201. The event object metadata set 201 may include a title parameter 203, a time parameter 205, a location parameter 207, an attendee parameter 209, a visibility parameter 211, and a calendar parameter 213.

The title parameter 203 may be a text string that describes the title associated with the calendar event (for example, "product release conference"). The time parameter 205 may describe the date, starting time and ending time associated with the calendar event (for example, "2 p.m. to 3 p.m. on Jan. 2, 2019"). In various embodiments, the time parameter 205 is a digital representation of the network system time. In various embodiments of the present disclosure, a server circuitry may execute the following programming code to obtain the time parameter 205 of the event object metadata set 201 of the event object 200:

```
message LocalDate {
    int32 year;
    int32 month;
}
message DateTime {
    oneof value {
        int64 date_time; // epoch seconds
        LocalDate date; // all-day
    }
}
```

The location parameter 207 describes the location associated with the calendar event (for example, "Conference Room A"). The attendee parameter 209 comprises user identifier(s) of user(s) (for example, channel members) who are invited to the calendar event and their responses to the invitation (e.g. accepting or declining of the event invitation). In various embodiments of the present disclosure, a server circuitry may execute the following programming code to obtain the attendee parameter 209 of the event object metadata set 201 of the event object 200:

```
message Attendee {
    string email;
    string name;
    // whether the attendee is expected to respond to this invite
    bool is_rsvp_requested;
    AttendeeRole ; // attendee's role in meeting
    AttendeeStatus status; // attendee's current reply to the invite
    AttendeeType type; // attendee type
}
enum AttendeeRole {
    REQUIRED = 0;
    OPTIONAL = 1;
    CHAIR = 2;
    NONPARTICIPANT = 3;
}
enum AttendeeStatus {
    NEEDS_ACTION = 0;
    ACCEPTED = 1;
    DECLINED = 2;
    TENTATIVE = 3;
    DELEGATED = 4;
}
enum AttendeeType {
    INDIVIDUAL = 0;
    GROUP = 1;
    RESOURCE = 2;
    ROOM = 3;
    UNKNOWN = 4;
}
```

In various embodiments of the present disclosure, the attendee parameter 209 may also be used to generate an event object for a channel calendar. For example, by assigning a channel calendar identifier to the attendee parameter 209, the event object 200 may become associated with the channel calendar corresponding to the channel calendar identifier, details of which are described hereinafter.

The event object metadata set 201 may also include a visibility parameter 211 that shows the visibility of the calendar event to other channel member(s) in the group-based communication channel, and represents access control of the event object. For example, the visibility parameter 211 may include an electronic indication on whether to render the calendar event for display on a channel calendar.

The event object metadata set 201 may also include a calendar parameter 213, which shows the calendar object(s) that the event object 200 is associated with. For example, referring back to FIG. 1, the calendar parameters may be in the form of ASCII characters that correspond to the calendar object 100 (for example, an identifier of the calendar object 100).

Alternatively or additionally, the event object metadata set 201 of the event object 200 may further include other parameters. For example, the event object metadata set 201 may include a details parameter. The details parameter may include a text string that describes the details of the event, such as but not limited to, the event agenda. The event object metadata set 201 may also include an owner parameter, which may be a text string that identifies the event creator.

As described further below in connection with at least FIG. 5, one group-based communication channel may be associated with one or more calendar objects. As such, event object(s) associated with these calendar objects (based on, for example, calendar parameters of the corresponding event object metadata sets) may be viewable to members of the group-based communication channel (based on, for example, visibility parameters of the corresponding event object metadata sets).

Referring back to in FIG. 2, one or more other data objects may be connected to the event object 200, including, for example, a call object 214, a document object 216, and a task object 218. The call object 214 may represent a video conference call associated with the event object 200. The document object 216 may represent electronic documents associated with the event object 200. Such electronic documents may include, for example, call notes, transcripts, summary posts, documents shared by the channel members for the event, and video recordings from the event. The task object 218 may represent action items associated with the event object 200.

In various embodiments of the present disclosure, a data object may be generated in response to a "generation request," which is an electronic request for generating a data object. For example, a user operating a client device in communication with the group-based communication system may submit an event generation request to request generating an event object. Such event generation request may be in the form of an electronic message associated with a group-based communication channel. In some examples, the event generation request may be submitted to an external calendar resource. In the present disclosure, the term "an external calendar resource" refers to an electronic calendar service that is separated from the group-based communication system, as described below.

In various embodiments of the present disclosure, a data object may be stored in a collective repository, such as a database or a server. For example, a calendar object generated by an external resource may be stored in a calendar object repository provided by or connected to the external resource. As another example, an event object generated by an external resource may be stored in an event object repository provided by or connected to the external resource.

In various embodiments of the present disclosure, a data object may be accessible by members of a group-based communication channel in a group-based communication system. For example, the group-based communication system may receive a "calendar sharing request" from a client device, which is an electronic request for authorization to allow members of the group-based communication channel to access, modify, and/or cause the rendering of the calendar object. In response to receiving the calendar sharing request, the group-based communication system may assign a channel calendar identifier associated with a group-based communication channel (for example, an email address) to a calendar object, and cause the rendering of the calendar object in a user interface associated with the group-based communication channel.

In some examples, one or more calendar objects may be shared with the group-based communication system, but not shared with a particular group-based communication channel (referred to hereinafter as "pre-shared calendar object").

In other words, a "pre-shared calendar object" may be accessible by members of one group-based communication channel, but not accessible by members of another group-based communication channel. In some examples, after receiving a calendar sharing request, the group-based communication system may generate a list of pre-shared calendar objects associated with the group-based communication system, and may receive an electronic selection of a pre-shared calendar object to be shared with a particular group-based communication channel.

In some examples, one or more event objects may be shared with the group-based communication system, but not shared with a particular group-based communication channel (referred to hereinafter as "pre-shared event object"). In other words, a "pre-shared event object" may be accessible by members of one group-based communication channel, but not accessible by members of another group-based communication channel. For example, a pre-shared event object may be connected to a pre-shared calendar object, and members of a particular group-based communication channel do not have access privilege to the pre-shared calendar object. As such, members of that particular group-based communication channel do not have access privilege to the pre-shared event object. In this regard, the group-based communication system may generate a sharing link (such as a hyperlink) for the pre-shared event object, allowing the client device to add the pre-shared event object to a channel calendar, details of which are described in the present disclosure.

The term "external resource" refers to a software program, application, platform, or service that is configured to communicate with the group-based communication system for providing an external service (i.e., not native to the group-based communication system) to a client device via a group-based communication interface. In some examples, an external resource may be an external calendar resource, as described below. In some examples, an external resource may be an external email resource, as described below. In some examples, an external resource may be a validated external resource, as described below.

For example, an external resource may be an "external calendar resource," which refers to a software program, application, platform, or service that is configured to provide electronic calendar ("calendar") services to users operating client devices. The external calendar resource may comprise, for example, a calendar client and a web calendar access protocol ("WCAP") server. The external calendar resource is configured to allow a user to create calendar objects and event objects, as described above. The external calendar resource operates on a compiled code base or repository that is separate and distinct from that which supports the group-based communication system. In some examples, the group-based communication system may subscribe to an application programming interface (API) of the external calendar resource that is configured to transmit one or more data objects as defined above. Example external calendar resources include, for example, Microsoft Office® and Google® Calendar.

As another example, the term "external email resource" refers to a software program, application, platform, or service that is configured to provide electronic mail ("email") services to users operating client devices. The external email resource comprises an email client, a simple mail transfer protocol ("SMTP") server, and a domain name server ("DNS"). The external email resource is configured to allow a sending user ("a sender") to create and transmit an email message to a receiving user ("a recipient"). Each email message comprises an email envelope that defines its electronic format, an email header that comprises sender/recipient information and an email subject line, and an email body that comprises text, images, and file attachments. The external email resource operates on a compiled code base or repository that is separate and distinct from that which supports the group-based communication system. Example external email resources include Microsoft Office 365®, Gmail®, and Yahoo Mail®.

An email client of the external email resource may be used by a sender to create and transmit an email message. The email message text and attachments are thus uploaded to the SMTP server as outgoing mail. A copy of the email message is stored to an email outbox associated with the sender for later retrieval. The SMTP server communicates with the DNS to find a recipient email server using recipient information drawn from the email header. Once the SMTP server finds the recipient email server, it transfers the email message to the recipient email server. The next time the recipient accesses the email client, the email client downloads the email message from the recipient email server for presentation to the recipient in an email inbox interface.

The external email resource may also include programs, applications, platforms, or services configured to provide services related to providing email services. For example, external email resources configured in accordance with embodiments herein described include calendar and scheduling services. Such calendar and scheduling services are configured to provide one or more files containing one or more data objects to the group-based communication system. For example, the group-based communication system may subscribe to an application program interface (API) of the external email resource that is configured to transmit one or more data objects.

The term "single-user external email corpus" refers to a file object containing all email messages and user account information that is necessary for an external email resource to reconstruct an email account (including all associated calendar and scheduling services) associated with a single user. The single-user external email corpus may include email attachments, such as calendar invitations, received and sent by a user. The single-user external email corpus may be stored in a personal storage table (".pst") format. Additionally or alternatively, some or all of the single-user external email corpus, such as the calendar and scheduling services, may be stored in an iCalendar (".ics") format or a vCalendar (".vcs") format.

The term "multi-user external email corpus" refers to a file object containing all email messages and user account information that is necessary for an external email resource to reconstruct email accounts (including all associated calendar and scheduling services) associated with multiple enterprise users. For example, an enterprise administrator may use a multi-user external email corpus to rebuild email accounts for employees of ACME Corporation. The multi-user external email corpus may include email attachments, such as calendar invitations, received and sent by the multiple user. The multi-user external email corpus may be stored in .pst format. Additionally or alternatively, some or all of the multi-user external email corpus, such as the calendar and scheduling services, may be stored in an iCalendar (".ics") format or a vCalendar (".vcs") format.

In some examples, an external resource (such as an external calendar resource and/or an external email resource), may be an "validated external resource." A validated external resource operates on a compiled code base or repository that is separate and distinct from that which supports the group-based communication system. In some embodiments, the validated external resource may communicate with the group-based communication system, and vice versa, through one or more application programming interfaces (APIs). In some embodiments, the validated external resource generates and/or receives tokens or other authentication credentials that are used to facilitate secure communication between the validated external resource and the group-based communication system in view of group-based communication system network security layers or protocols (e.g., network firewall protocols).

The term "external resource user identifier" refers to one or more items of data by which a user (or user profile) of validated external resource, an external calendar resource or an external email resource may be uniquely identified by a group-based communication system. For example, an external resource user identifier may comprise American Standard Code for Information Interchange (ASCII) text, a pointer, a memory address, and the like. One or more external resource user identifiers may be stored to a user profile of a group-based communication system along with other identifiers (e.g., user identifier, group identifiers, group-based communication channel identifiers, etc.). The external resource user identifier may be embodied in a format native to the validated external resource, the external calendar resource or the external email resource to which it is associated or may be structured in a format designated by the group-based communication system. Correlating one or more external resource user identifiers to a user account or user identifier of the group-based communication system allows the group-based communication system to link accounts from disparate validated external resources, external calendar resources or external email resources with a selected group-based communication system user account. In some embodiments, the external resource user identifier may be defined by the external resource. The external resource user identifier may include an integer identifier, a universally unique identifier, an email address, a random string, and/or the like. In such a case, the group-based communication server may receive the external resource user identifier during the open authorization (OAuth) process.

The term "group-based communication repository" refers to the location, such as a memory device, where one or more data objects (such as calendar objects and/or event objects) are stored. The group-based communication repository may be a dedicated device and/or a part of a larger repository. The group-based communication repository may be dynamically updated or be static. The group-based communication repository may be encrypted in order to limit unauthorized access of user activity data logs and associated engagement data.

The term "group-based communication interface" refers to a virtual communications environment configured to facilitate user interaction with a group-based communications system. Each group-based communication interface is accessible and viewable to a select group of users, such as a group of employees of a business or organization (e.g., the Slack Corp. interface would be accessible and viewable to the Slack employees however the ACME Corporation group-based communication interface would not be accessible and viewable to Slack employees). The group-based communication interface comprises a plurality of group-based communication channels (e.g., a marketing channel, sales channel, accounting channel, etc.), which are defined below. In the present disclosure, the term "pane" refers to a user interface (such as a group-based communication interface)) element that is rendered as a section of the interface. A pane may display information, such as, for example, a rendering of a calendar object.

Having a channel calendar improves the efficiency in coordinating and scheduling events among the channel members, reduces redundancy in sharing calendars, reduces computer resource usage and network traffic congestion, details of which are described hereinafter.

Example System Architecture for Implementing Embodiments of the Present Disclosure Methods, apparatuses, and computer program products of the present disclosure may be embodied by any of a variety of devices. For example, the method, apparatus, and computer program product of an example embodiment may be embodied by a networked device (e.g., a group-based communication system), such as a server or other network entity, configured to communicate with one or more devices, such as one or more client devices. Additionally or alternatively, the computing device may include fixed computing devices, such as a personal computer or a computer workstation. Still further, example embodiments may be embodied by any of a variety of mobile devices, such as a portable digital assistant (PDA), mobile telephone, smartphone, laptop computer, tablet computer, wearable, or any combination of the aforementioned devices.

FIG. 3 illustrates an example system architecture 300 within which embodiments of the present disclosure may operate. The system may comprise a repository (such as the group-based communication repository 317A and the user identification repository 317B) and a server (such as a group-based communication server 309), details of which are described hereinafter.

Users may access a group-based communication system 305 via a communication network 303 using client devices 301A-301N. The client devices 301A-301N may be a computing device as defined herein. Electronic data received by the group-based communication system 305 from the client devices 301A-301N may be provided in various forms and via various methods. For example, the client devices 301A-301N may include desktop computers, laptop computers, smartphones, netbooks, tablet computers, wearables, and the like.

In embodiments where a client device of client devices 301A-301N is a mobile device, such as a smart phone or tablet, the client device may execute an "app" to interact with the group-based communication system 305. Such apps are typically designed to execute on mobile devices, such as tablets or smartphones. For example, an app may be provided that executes on mobile device operating systems such as iOS®, Android®, or Windows®. These platforms typically provide frameworks that allow apps to communicate with one another and with particular hardware and software components of mobile devices. For example, the mobile operating systems named above each provide frameworks for interacting with location service circuitry, wired and wireless network interfaces, user contacts, and other applications.

Additionally or alternatively, the client devices 301A-301N may interact with the group-based communication system 305 via a web browser or through a web application that runs in a web browser. As yet another example, the client devices 301A-301N may include various hardware or firmware designed to interface with the group-based communication system 305.

Communication network 303 may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, communication network 303 may include an 802.11, 802.16, 802.20, and/or WiMax network. Further, the communication network 303 may include a public network (such as the Internet), a private network (such as an intranet), or combinations thereof, and may utilize a variety of networking protocols including, but not limited to, TCP/IP based networking protocols. For instance, the networking protocol may be customized to suit the needs of the group-based communication system 305. In some embodiments, the protocol is a custom protocol of JSON (JavaScript Object Notation) objects sent via a Websocket channel. In some embodiments, the protocol is JSON over RPC, JSON over REST/HTTP, and the like.

In various embodiments of the present disclosure, an electronic message, a calendar sharing request, an event generation request and/or an event sharing request may be sent to the group-based communication system 305 via, for example, the communication network 303 directly by a client device of client devices 301A-301N. The electronic message, the calendar sharing request, the event generation request, and/or the event sharing request may be also sent to the group-based communication system 305 via an intermediary.

In some embodiments, the group-based communication system 305 comprises a group-based communication server 309, a group-based communication repository 317A, and a user identification repository 317B.

The group-based communication repository 317A may be embodied as a data storage device such as a Network Attached Storage (NAS) device or devices, or as a separate database server or servers. The group-based communication repository 317A comprises information accessed and stored by the group-based communication server 309 to facilitate the operations of the group-based communication system 305. For example, the group-based communication repository 317A may include, without limitation, a plurality of requests, invitations, communications, user identifiers, external resource user identifiers, and the like organized within the group-based communication repository 317A. For example, the group-based communication server 309 may provide electronic data relating to a user's interactions with the system, and the electronic data may be stored on the group-based communication repository 317A. In some embodiments, the group-based communication repository 317A may be in communication with the group-based communication server 309 through the communication network 303. In some embodiments, the group-based communication repository 317A and the group-based communication server 309 may be contained in the group-based communication system 305.

In some embodiments, the group-based communication system 305 may be configured to include or be in communication with a user identification repository 317B. The user identification repository 317B may include identification data for one or more users. In some embodiments, the user identification repository 317B may include user identifiers, channel calendar identifiers, channel identifiers, group identifiers, and the like. For example, the user identification repository 317B may receive user profile information from the group-based communication server 309, and also receive additional identification data, such channel calendar identifiers. In some embodiments, the user identification repository 317B may be included in the same server as the group-based communication repository 317A.

It is noted that various components in the group-based communication server 309 may leverage the same computer or computing apparatus to perform various operations, and various components of the group-based communication repository 317A and the user identification repository 317B may leverage the same computer or computing apparatus to perform the above-described operations.

As shown in FIG. 3, the group-based communication system 305 may be in communication with one or more external calendar resources 311A-311N via the communication network 303. The one or more external calendar resources 311A-311N may be embodied as computers, and may further provide information regarding external calendar resources. For example, the one or more external calendar resources 311A-311N may store calendar objects in a calendar object repository. As another example, the one or more external calendar resources 311A-311N may generate event objects in response to event generation requests.

The one or more external calendar resources 311A-311N may implement different calendar server protocols (including protocols for remote client-server calendar access and scheduling based on the XML, HTTP, and other standards), and may provide calendar services separated from the group-based communication system 305 and/or among other external calendar resources 311A-311N. For example, one of the external calendar resources 311A-311N may be provided by Google® Calendar, and another may be provided by Microsoft Office®.

In some examples, the one or more external calendar resources 311A-311N may be validated such that they provide secure communication between the one or more external calendar resources 311A-311N and the group-based communication system 305 through, for example, one or more application programming interfaces (APIs). In some examples, other validated external resource (such as validated external resource 307) may be in communication with the group-based communication system 305, providing services that are not related to electronic calendar.

Example Apparatus for Implementing Embodiments of the Present Disclosure

The group-based communication server 309 of FIG. 3 may be embodied by one or more computing systems, such as apparatus 400 shown in FIG. 4. The apparatus 400 may include processor 402, memory 404, input/output circuitry 406, communications circuitry 408, channel calendar circuitry 410, and calendar rendering circuitry 412. The apparatus 400 may be configured to execute the operations described above with respect to FIG. 3 and below with respect to FIGS. 5-24. Although these components 402-412 are described with respect to functional limitations, it should be understood that the particular implementations necessarily include the use of particular hardware. It should also be understood that certain of these components 402-412 may include similar or common hardware. For example, two sets of circuitries may both leverage use of the same processor, network interface, storage medium, or the like to perform their associated functions, such that duplicate hardware is not required for each set of circuitries.

In some embodiments, the processor 402 (and/or co-processor or any other processing circuitry assisting or otherwise associated with the processor) may be in communication with the memory 404 via a bus for passing information among components of the apparatus. The memory 404 is non-transitory and may include, for example, one or more volatile and/or non-volatile memories. In other words, for example, the memory 404 may be an electronic storage device (e.g., a computer-readable storage medium). The memory 404 may be configured to store information, data, content, applications, instructions, or the like for enabling the apparatus to carry out various functions in accordance with example embodiments of the present disclosure.

The processor 402 may be embodied in a number of different ways and may, for example, include one or more processing devices configured to perform independently. In some preferred and non-limiting embodiments, the processor 402 may include one or more processors configured in tandem via a bus to enable independent execution of instructions, pipelining, and/or multithreading. The use of the term "processor" or "processing circuitry" may be understood to include a single core processor, a multi-core processor, multiple processors internal to the apparatus, and/or remote or "cloud" processors.

In some preferred and non-limiting embodiments, the processor 402 may be configured to execute instructions stored in the memory 404 or otherwise accessible to the processor 402. In some preferred and non-limiting embodiments, the processor 402 may be configured to execute hard-coded functionalities. As such, whether configured by hardware or software methods, or by a combination thereof, the processor 402 may represent an entity (e.g., physically embodied in circuitry) capable of performing operations according to an embodiment of the present disclosure while configured accordingly. Alternatively, as another example, when the processor 402 is embodied as an executor of software instructions, the instructions may specifically configure the processor 402 to perform the algorithms and/or operations described herein when the instructions are executed.

In some embodiments, the apparatus 400 may include input/output circuitry 406 that may, in turn, be in communication with processor 402 to provide output to the user and, in some embodiments, to receive an indication of a user input. The input/output circuitry 406 may comprise a user interface circuitry and may include a display, which may comprise a web user interface, a mobile application, a client device, a kiosk, or the like. In some embodiments, the input/output circuitry 406 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 404, and/or the like).

The communications circuitry 408 may be any means such as a device or circuitry embodied in either hardware or a combination of hardware and software that is configured to receive and/or transmit data from/to a network and/or any other device, circuitry, or module in communication with the apparatus 400. In this regard, the communications circuitry 408 may include, for example, a network interface for enabling communications with a wired or wireless communication network (such as the communication network 303 as shown in FIG. 3). For example, the communications circuitry 408 may include one or more network interface cards, antennae, buses, switches, routers, modems, and supporting hardware and/or software, or any other device suitable for enabling communications via a network. Additionally or alternatively, the communications circuitry 408 may include the circuitry for interacting with the antenna/antennae to cause transmission of signals via the antenna/antennae or to handle receipt of signals received via the antenna/antennae.

The channel calendar circuitry 410 includes hardware configured to generate a channel calendar, details of which are described hereinafter. The channel calendar circuitry 410 may utilize processing circuitry, such as the processor 402, to perform these actions. In some embodiments, the channel calendar circuitry 410 may include a separate processor, specially configured Field Programmable Gate Array (FPGA), or Application Specific Integrated Circuit (ASIC). The channel calendar circuitry 410 may be implemented using hardware components of the apparatus configured by either hardware or software for implementing the functions described herein.

The calendar rendering circuitry 412 includes hardware configured to cause the rendering of a channel calendar in a user interface of a client device. The calendar rendering circuitry 412 may utilize processing circuitry, such as the processor 402, to perform these actions. However, it should also be appreciated that, in some embodiments, the calendar rendering circuitry 412 may include a separate processor, specially configured Field Programmable Gate Array (FPGA), or Application Specific Integrated Circuit (ASIC) for performing the functions described herein. The calendar rendering circuitry 412 may be implemented using hardware components of the apparatus configured by either hardware or software for implementing these planned functions.

It is also noted that all or some of the information discussed herein can be based on data that is received, generated and/or maintained by one or more components of apparatus 400. In some embodiments, one or more external systems (such as a remote cloud computing and/or data storage system) may also be leveraged to provide at least some of the functionality discussed herein.

In some embodiments, other elements of the apparatus 400 may provide or supplement the functionality of particular circuitry. For example, the processor 402 may provide processing functionality, the memory 404 may provide storage functionality, the communications circuitry 408 may provide network interface functionality, and the like. As will be appreciated, any such computer program instructions and/or other type of code may be loaded onto a computer, processor or other programmable apparatus's circuitry to produce a machine, such that the computer, processor or other programmable circuitry that execute the code on the machine creates the means for implementing various functions, including those described herein.

As described above and as will be appreciated based on this disclosure, embodiments of the present disclosure may be configured as methods, mobile devices, backend network devices, and the like. Accordingly, embodiments may comprise various means including entirely of hardware or any combination of software and hardware. Furthermore, embodiments may take the form of a computer program product on a non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Example Methods for Implementing Embodiments of the Present Disclosure

Various methods described herein, including, for example, example methods as shown in FIGS. 5-9, may facilitate creating a channel calendar in a group-based communication channel, It is noted that each block of the flowchart, and combinations of blocks in the flowchart, may be implemented by various means such as hardware, firmware, circuitry and/or other devices associated with execution of software including one or more computer program instructions. For example, one or more of the procedures described in FIGS. 5-9 may be embodied by computer program instructions, which may be stored by a non-transitory memory of an apparatus employing an embodiment of the present disclosure and executed by a processor in the apparatus. These computer program instructions may direct a computer or other programmable apparatus to function in a particular manner, such that the instructions stored in the computer-readable storage memory produce an article of manufacture, the execution of which implements the function specified in the flowchart block(s).

FIGS. 5 and 6 illustrate example methods 500 and 600, respectively, for generating channel calendars in a group-based communication channel.

Referring now to FIG. 5, the example method 500 starts at block 501. At block 503, a server circuitry (such as the group-based communication server 309 as shown in FIGS. 3 and 4) may generate a channel calendar identifier.

In particular, the channel calendar identifier may be associated with a group-based communication channel in the group-based communication system. In some examples, the channel calendar identifier may be a string of ASCII text that uniquely identifies a group-based communication channel in the group-based communication system.

In some examples, a channel calendar identifier may correspond to a channel identifier of a group-based communication channel. In some examples, a channel identifier may correspond to one or more channel calendar identifiers, as one or more calendars may be shared in the group-based communication channel. In other words, one group-based communication channel may have one or more channel calendars.

In some examples, the channel calendar identifier may be an email address. In such examples, the to-be-shared calendar object may be stored in a calendar object repository associated with an external calendar resource (such as the GOOGLE® G SUITE platform), and the email address may have a domain name provided by the external calendar resource (such as @GMAIL.COM). In some examples, the email address may be generated based on one or more parameters in the calendar object metadata set of the to-be-shared calendar object, including, but not limited to, the title parameter and/or the owner parameter.

At block 505, a server circuitry (such as the group-based communication server 309 as shown in FIGS. 3 and 4) may receive a calendar sharing request associated with the channel calendar identifier. In particular, the calendar sharing request may comprise a request to access a calendar object from the group-based communication channel, and the calendar object may include a calendar object metadata set.

In some examples, the calendar sharing request may be received from a client device associated with the group-based communication channel. For example, the client device may be associated with an email address, and the server circuitry may retrieve user profiles associated with the group-based communication channel to determine whether the email address is associated with any member of the group-based communication channel. In response to determining that the email address is associated with a channel member, the method 500 may proceed to block 507. If the email address is not associated with any channel member, the method 500 ends at block 511.

Additionally or alternatively, the calendar sharing request may be in the form of an electronic message in the group-based communication channel. For example, a client device may transmit an electronic message to the group-based communication channel, which comprises a request to provide access of a calendar object associated with the client device to members of the group-based communication channel.

Additionally or alternatively, the calendar sharing request may be in the form of a message generated by an external calendar resource. In some examples, the message is an electronic message transmitted to the group-based communication channel as described above. In some examples, the message is a request associated with the application programming interface (API) provided by the group-based communication system.

At block 507, a server circuitry (such as the group-based communication server 309 as shown in FIGS. 3 and 4) may retrieve the calendar object and its corresponding calendar object metadata set associated with the calendar sharing request.

In some examples, the calendar object and its corresponding calendar object metadata set may be generated by an external calendar resource, such as Google® Calendar as described above. In such examples, the server circuitry may receive calendar object and its corresponding calendar object metadata set from the external calendar resource.

In some examples, the calendar object and its associated calendar object metadata set may be generated by the group-based communication system. In such examples, the server circuitry may receive calendar object and its corresponding calendar object metadata set from one or more calendar object repositories within the group-based communication system, such as the group-based communication repositories 317A as described above in connection with FIG. 3. Further, the server circuitry may cause the rendering of the calendar object(s) (and the associated event object(s)) for display via a user interface (such as a group-based communication interface), as described below.

Additionally or alternatively, the calendar sharing request may comprise an external resource user identifier (as identified above), and the server circuitry may retrieve the calendar object and its corresponding calendar object metadata set based at least in part on the external resource user identifier.

At block 509, a server circuitry (such as the group-based communication server 309 as shown in FIGS. 3 and 4) may cause the rendering of the calendar object for display via a user interface of a client device. In particular, the user interface may be a group-based communication interface, and may be associated with the group-based communication channel. Example user interfaces are described in detail in connection with FIGS. 10-24.

In some examples, the rendering is based at least in part on the calendar object metadata set of the calendar object. For example, as described above in connection with FIG. 1, the calendar object metadata set 101 may include a title parameter 103. Accordingly, when rendering the calendar object 100 for display, the user interface may show the title as defined by the title parameter 103.

In some examples, the calendar object may be connected to one or more event objects, and rendering the calendar object may further be based on the event object metadata sets associated with the one or more event objects. Example methods are further described in connection with FIG. 9.

In some examples, the server circuitry may render the calendar object via a user interface, and transmit the rendered calendar object and/or the user interface to a client device for display. In some examples, the server circuitry may generate and transmit electronic notifications to a client device, causing the client device to render the calendar object for display via the user interface associated with the group-based communication channel.

The method 500 ends at block 511.

Referring now to FIG. 6, an example method 600 for generating a channel calendar in a group-based communication channel is shown.

The method 600 starts at block 602. At block 604, a server circuitry (such as the group-based communication server 309 as shown in FIGS. 3 and 4) may determine whether the client device is associated with any pre-shared calendar object.

As described above, a client device may be associated with one or more pre-shared calendar objects. A pre-shared calendar object is a calendar object that has been shared with the group-based communication system, but has not been shared with the particular group-based communication channel as identified in the calendar sharing request. For example, the group-based communication system may have received electronic authorization (for example, from a client device) that allows a group-based communication channel to access a pre-shared calendar object, but have not received authorization to allow a different group-based communication channel to access the pre-shared calendar object.

If, at block 604, the server circuitry determines that the client device is not associated with any pre-shared calendar object, the method 600 ends at block 612.

If, at block 604, the server circuitry determines that the client device is associated with a pre-shared calendar object, the method 600 proceeds to block 606. At block 606, the server circuitry generates a pre-shared calendar list. The pre-shared calendar list may comprise the pre-shared calendar object associated with the client device in the group-based communication system.

In some examples, the server circuitry may cause the rendering of the pre-shared calendar list as one or more buttons and/or drop-down menu items in a user interface associated with the client device.

At block 608, the server circuitry (such as the group-based communication server 309 as shown in FIGS. 3 and 4) may receive a calendar sharing request. In some examples, the calendar sharing request may be in the form of an electronic selection of a pre-shared calendar object. The electronic selection may be sent via a user interface associated with the group-based communication channel. For example, a user may request sharing a pre-shared calendar object with a group-based communication channel by navigating the user interface using a client device, and may click, tap, or other select the one or more buttons and/or drop-down menu items via the user interface as described above. In response, the client device may generate and transmit a calendar sharing request to the group-based communication system.

In some examples, subsequent to receiving the calendar sharing request, the server circuitry may retrieve the calendar object and its associated calendar object metadata set, similar to block 507 described above in connection with FIG. 5.

At block 610, the server circuitry (such as the group-based communication server 309 as shown in FIGS. 3 and 4) may cause the rendering of the calendar object for display on the user interface, similar to block 509 described in connection with FIG. 5.

The method 600 ends at block 612.

Referring now to FIG. 7, an example method 700 for sharing an event object for display on a channel calendar associated with a group-based communication channel is shown.

The method 700 starts at block 701. At block 703, a server circuitry (such as the group-based communication server 309 as shown in FIGS. 3 and 4) may receive an event generation request. The event generation request may be in the form of an electronic message that requests creation of an event object.

In some examples, the event generation request may include a request for an event object. The event generation request may also specify one or more parameters of the event object metadata set. For example, the event generation request may provide an attendee parameter and/or a calendar parameter.

At block 705, a server circuitry (such as the group-based communication server 309 as shown in FIGS. 3 and 4) may retrieve the event object generated in response to the event generation request.

In some examples, the event object may be generated using an external calendar resource. In such examples, the server circuitry may transmit the event generation request to the external calendar resource. In response to the event generation request, the external calendar resource may generate an event object, and the server circuitry may retrieve the event object from the external calendar resource. In some examples, the event object may be generated by the group-based communication system.

Additionally or alternatively, the server circuitry may retrieve the event object based at least in part on the external resource user identifier.

At block 707, a server circuitry (such as the group-based communication server 309 as shown in FIGS. 3 and 4) may determine whether the attendee parameter or calendar parameter is associated with a channel calendar identifier.

In some examples, the channel calendar identifier may be in the form of an email address associated with a group-based communication channel, similar to those described above in connection with FIG. 5. As such, the server circuitry may determine whether the attendee parameter or the calendar parameter comprises an email address associated with a group-based communication channel.

If, at block 707, the server circuitry determines that neither the attendee parameter nor the calendar parameter is associated with the channel calendar identifier, the method 700 ends at block 711.

If, at block 707, the server circuitry determines that either the attendee parameter or the calendar parameter is associated with the channel calendar identifier, the method 700 proceeds to block 709. At block 709, a server circuitry (such as the group-based communication server 309 as shown in FIGS. 3 and 4) may cause the rendering of the event object for display on the user interface. For example, the server circuitry may cause the rendering of the event object on a visual representation of the channel calendar in a user interface associated with the group-based communication channel. Example user interfaces are described in detail in connection with FIGS. 10-24.

The method 700 ends at block 711.

Referring now to FIG. 8, an example method 800 for sharing an event object for display on a channel calendar associated with a group-based communication channel is shown.

The method 800 starts at block 802.

At block 804, a server circuitry (such as the group-based communication server 309 as shown in FIGS. 3 and 4) may generate a sharing link corresponding to a pre-shared event object.

As described above, a pre-shared event object is an event object that is not accessible by members of a particular group-based communication channel, but is accessible by members of a different group-based communication channel. For example, a user may have shared an event object related to a product release conference with a group-based communication channel related to product development, but have not shared the event object to a particular group-based communication channel related to product sales.

In some examples, the server circuitry may generate a sharing link corresponding to the pre-shared event object. The sharing link may be a hyperlink that locates the pre-shared event object in the group-based communication system or in an external calendar resource.

In some examples, the sharing link may be obtained by a user operating a client device in communication with the group-based communication system (such as, for example, one of the client devices 301A-301N). For example, the server circuitry may cause the rendering of the pre-shared event object via a user interface, such that the sharing link is copied by the client device when the user clicks, taps or otherwise selects the rendering of the pre-shared event object via the client device.

Additionally or alternatively, when the user is associated with more than one pre-shared event objects, the server circuitry may render the pre-shared event object as one or more buttons and/or drop-down menu items via the user interface, such that when the user clicks, taps or otherwise selects one or more of these buttons and/or drop-down menu items, an event sharing link corresponding to the selected pre-shared event object is copied by the client device.

In some examples, if the pre-shared event object represents a recurring event, the server circuitry may generate a sharing link that includes an electronic indication of not only the present occurrence of the event, but also future occurrences of the event. Such electronic indication may be, for example, in the form of ASCII characters or texts embedded in the sharing link. In such examples, when the user copies the sharing link of the recurring pre-shared event object via a client device, the client device also obtains sharing links for all future occurrences of the event.

Referring back to FIG. 8, at block 806, a server circuitry (such as the group-based communication server 309 as shown in FIGS. 3 and 4) may receive an event sharing request associated with the sharing link.

In some examples, the event sharing request may be received by the server circuitry via a user interface of the client device. For example, as described above in connection with block 804, the client device may copy an event sharing link associated with the pre-shared event object. At block 806, when a user operates the client device to paste the event sharing link to a rendering of a channel calendar associated with a group-based communication channel, the client device may generate an event sharing request, indicating an electronic request to add the pre-shared event object to the channel calendar.

In some examples, the event sharing request may be received by the server circuitry via a plug-in. A plug-in is a software component that adds a specific feature to a computer program or system. For example, a plug-in may be installed by a user of an external calendar resource. When the user clicks, taps or otherwise selects a rendering of an event object stored in the external calendar resource, the plug-in may cause the rendering of a button and/or drop-down menu item that visually represents an option to share the event object to a group-based communication channel. When the user clicks, taps, or otherwise selects the button and/or drop-down menu item, the plug-in may generate an event sharing request associated with the event object, and may transmit the event sharing request to the group-based communication system.

At block 808, a server circuitry (such as the group-based communication server 309 as shown in FIGS. 3 and 4) may cause the rendering of the pre-shared event object for display on the user interface, similar to block 709 described above in connection with FIG. 7. In examples where the pre-shared event object represents a recurring event, the server circuitry may cause the rendering of future occurrences of the event on the channel calendar.

The method 800 ends at block 810.

Referring now to FIG. 9, an example method 900 for rendering an event object for display on a channel calendar associated with a group-based communication channel is shown.

The method 900 starts at block 901. At block 903, a server circuitry (such as the group-based communication server 309 as shown in FIGS. 3 and 4) may analyze an event object metadata set of an event object.

In some examples, the event object is associated with a calendar object that is shared with a group-based communication channel (i.e. members of the group-based communication channel can access the calendar object). For example, the calendar object may be shared with the group-based communication channel in accordance with method 500 described above in connection with FIG. 5 and/or method 600 described above in connection with FIG. 6.

In some examples, the event object itself is shared with the group-based communication channel (i.e. members of the group-based communication channel can access the event object). For example, the event object may be shared with the group-based communication channel in accordance with method 700 described above in connection with FIG. 7 and/or method 800 described above in connection with FIG. 8.

At block 905, a server circuitry (such as the group-based communication server 309 as shown in FIGS. 3 and 4) may determine whether the visibility parameter comprises an electronic indication that the event object is visible to the channel. Such electronic indication may be in the form of, for example, ASCII characters or texts.

As described above, an event object may include an event object metadata set. For example, as shown in FIG. 2 and described above, the event object metadata set 201 may include a visibility parameter 211. The visibility parameter may provide an electronic indication on, for example, whether a group-based communication channel has access privilege to the event object (i.e. whether to render the event object for display on a channel calendar).

In some examples, a visibility parameter of an event object metadata set may be determined by the server circuitry based on a privacy parameter of a corresponding calendar object metadata set. For example, as shown in FIG. 1, the event object 200A may be associated with the calendar object 100. The calendar object 100 may include a calendar object metadata set 101 having a privacy parameter 107. In some examples, the privacy parameter 107 may comprise ASCII characters or texts that show the calendar object 100 representing a private calendar. Accordingly, the visibility parameter of the event object metadata set of the event object 200A may comprise ASCII characters or texts that show the event representing a private event (that is not to be rendered for display on a channel calendar).

In some examples, the server circuitry may determine the visibility parameter of the event object metadata set independent from the privacy parameter of a corresponding calendar object metadata set. For example, a user may set the visibility parameter of an event object to be private, despite that the event object is associated with a calendar object that is accessible by members of a group-based communication channel. In other words, a calendar object shared with the group-based communication channel may be associated with an event object that represents a private event. In this example, the server circuitry may determine that the event is a private event that is not to be rendered for display on a channel calendar.

If, at block 905, the server circuitry determines that the visibility parameter comprises an electronic indication that the event object is visible to the group-based communication channel, the method 900 proceeds to block 907. At block 907, a server circuitry (such as the group-based communication server 309 as shown in FIGS. 3 and 4) may cause the rendering of the event object on the user interface, similar to block 709 described above in connection with FIG. 7.

If, at block 905, the server circuitry determines that the visibility parameter comprises an electronic indication that the event object is not rendered for display within the group-based communication channel (for example, the visibility parameter being set to private), the method 900 proceeds to block 911. At block 911, the server circuitry determines whether the group-based communication system receives a user request to provide access of the event object to a group-based communication channel (i.e. a user request to share the event object with the group-based communication channel).

If, at block 911, the server circuitry determines that the group-based communication system receives a user request to provide access of the event object to the group-based communication channel, the method 900 proceeds to block 913.

At block 913, a server circuitry (such as the group-based communication server 309 as shown in FIGS. 3 and 4) may cause rendering of a warning message via the user interface associated with the client device, and the warning message may caution the user that the event is a private event.

For example, an event object may include an event object metadata set having a visibility parameter, and the visibility parameter may comprise, for example, ASCII texts that show the event object representing a private event. The group-based communication system may receive an electronic request from the user, where the electronic request indicates a user request to allow members of a group-based communication channel to access the event object (for example, by copy-pasting a sharing link as described above in connection with FIG. 8). Upon receiving the electronic request, the server circuitry may cause rendering of a warning message for display via the user interface associated with the client device, warning the user that the event object represents a private event.

In some examples, the warning message may further include options for the user to continue with sharing the event object, or to stop sharing the event object. For example, the warning message may include buttons or drop-down menu items that allow a user to choose between "continue with sharing" or "do not share." If the user clicks, taps, or otherwise selects the "continuing with sharing" button/drop-down menu item, the server circuitry may overwrite the visibility parameter associated with the event object, and may further cause the rendering of the event object on the channel calendar. If the user clicks, taps, or other selects the "do not share" button/drop-down menu item, the method 900 ends at block 915.

If, at block 911, the server circuitry determines that the group-based communication system does not receive a user request to provide access of the event object to the group-based communication channel, the method 900 ends at block 915.

While the above description in connection with FIGS. 5-9 illustrate example methods in accordance with the present disclosure, it is noted that the scope of the present disclosure is not limited to the embodiments described above.

For example, various embodiments of the present disclosure enable a member of a group-based communication channel to copy an event object associated with the channel calendar to his personal calendar. For example, when a user navigates a user interface associated with a group-based communication channel using a client device, the user may want to participate an event listed on the channel calendar, despite that the user is not an attendee of the event (for example, based on the attendee parameter). A server circuitry (such as the group-based communication server 309 as shown in FIGS. 3 and 4) may cause the rendering of a button or drop-down menu item via the user interface (such as a [Add To Calendar/Copy to Calendar] button). Once the user clicks, taps or otherwise selects the button/drop-down menu item, the server circuitry may duplicate the event object, and may associate the duplicated event object with a calendar object corresponding to the user's personal calendar.

Example User Interfaces for Implementing Embodiments of the Present Disclosure

FIGS. 10-24 illustrate various example user interfaces in accordance with embodiments of the present disclosure. Such user interfaces may be, for example, group-based communication interfaces as defined above.

Referring now to FIGS. 10-14, example user interfaces associated with rendering of the calendar object for display via a user interface and generating an event object for the channel calendar are shown.

Referring now to FIG. 10, an example user interface 1000 is shown. The example user interface 1000 may include a channel side pane 1001, a channel messaging pane 1003, an input box 1005, and one or more buttons, such as the "channel calendar" button 1007.

The channel side pane 1001 may display information associated with the user of the group-based communication channel. For example, the channel side pane 1001 may display a list of group-based communication channels that the user is a member of, direct messages associated with the user, as well as validated external resource(s) that the user has provided authorized to access the group-based communication system.

The channel messaging pane 1003 may display data associated with the group-based communication channel, including, for example, text, images, calendar summaries, event reminders (as described in detail below). The input box 1005 allows a user to input data (such as text and images) to the group-based communication channel. Data input by the user via the input box 1005 may be displayed in the channel messaging pane 1003.

The "channel calendar" button 1007 allows the user to trigger the rendering of one or more channel calendars associated with the group-based communication channel. For example, when a user clicks, taps, or otherwise selects the "channel calendar" button 1007, a server circuitry (such as the group-based communication server 309 as shown in FIGS. 3 and 4) may cause the rendering of a channel calendar pane. An example user interface with an example channel calendar pane is illustrated in FIG. 11.

Referring now to FIG. 11, an example user interface 1100 with a channel calendar pane 1109 is illustrated. The user interface 1100 may include, for example, a channel side pane 1101, similar to the channel side pane 1001 described above in connection with FIG. 10. The user interface 1100 may also include, for example, a channel messaging pane 1103, similar to the channel messaging pane 1003 described above in connection with FIG. 10. The user interface 1100 may further include, for example, an input box 1105, similar to the input box 1005 described above in connection with FIG. 10.

Further, the example user interface 1100 includes a channel calendar pane 1109. As shown in FIG. 11, the channel calendar pane 1109 may include the rendering of the one or more channel calendars associated with the group-based communication channel. Further, the channel calendar pane 1109 may include a "create event" button 1111, which allows the user to trigger the creation of an event object for the channel calendar. For example, when a user clicks, taps, or otherwise selects the "create event" button 1111, a server circuitry (such as the group-based communication server 309 as shown in FIGS. 3 and 4) may cause the rendering of an event creation modal. An example event creation modal is illustrated in FIG. 12.

Referring now to FIG. 12, an example event creation modal 1200 is shown. The event creation modal 1200 allows the user to input one or more parameters associated with the event object metadata set of the to-be-created event object. For example, in the embodiment as illustrated in FIG. 12, the event creation modal 1200 allows the user to input the title parameter, time parameter, location parameter, attendee parameter, calendar parameter, etc. associated with the to-be-created event object.

In some examples, a server circuitry may generate one or more parameters for the event object metadata set via the event creation modal 1200. For example, the server circuitry may generate the attendee parameter based on the members of group-based communication channel (e.g. auto-filling the attendee parameter using user identifiers associated with the group-based communication channel). In some examples, the server circuitry may generate the calendar parameter based on the channel calendar associated with the group-based communication channel (e.g. auto-filling the calendar parameter using the channel calendar identifier).

After parameters are provided via the event creation modal 1200, the user may click, tap, or otherwise select the "create" button 1201 to trigger the creation of an event object for the channel calendar. In particular, the server circuitry may generate an event object associated with the channel calendar based on parameters provided via the event creation modal 1200 in accordance with various methods described above. The server circuitry may further cause the rendering of an event creation success modal. An example event creation success modal is illustrated in FIG. 13.

Referring to FIG. 13, an example event creation success modal 1300 is shown. The event creation success modal

1300 may include an event object representation 1301, which provides a summary view of the event object that has been created. The event creation success modal 1300 may also include one or more buttons, such as a "share event" button 1303, an "edit event" button 1305, and a "done" button 1307.

In some examples, when the user clicks, taps, or otherwise selects the "share event" button 1303, the server circuitry may trigger the sharing of the event object, including, for example, by generating a sharing link corresponding to the event object. In some examples, when the user clicks, taps, or otherwise selects the "edit event" button 1305, the server circuitry may cause the rendering of a user interface that allows the user to edit one or more parameters of the event object metadata set of the event object. In some examples, when the user clicks, taps, or other selects the "done" button 1307, the server circuitry may cause the rendering of a notification message, indicating the success of creating the event object. An example user interface with an example notification message is illustrated in FIG. 14.

Referring now to FIG. 14, an example user interface 1400 with a notification message 1411 is illustrated. The user interface 1400 may include, for example, a channel side pane 1401, similar to the channel side pane 1001 described above in connection with FIG. 10. The user interface 1400 may also include, for example, a channel messaging pane 1403, similar to the channel messaging pane 1003 described above in connection with FIG. 10. The user interface 1400 may further include, for example, an input box 1405, similar to the input box 1005 described above in connection with FIG. 10.

Further, the example user interface 1400 includes a channel calendar pane 1409, similar to the channel calendar pane 1109 described above in connection with FIG. 11. The example user interface 1400 may also include a notification message 1411. In some examples, the notification message 1411 may be generated in response to a new event object being associated with the channel calendar. In the example as shown in FIG. 14, the notification message 1411 may include the values of the title parameter and the calendar parameter associated with the event object.

Referring now to FIGS. 15-18, example user interfaces associated with displaying a channel calendar are shown.

Referring now to FIG. 15, an example user interface 1500 is shown. The user interface 1500 may include a channel title pane 1501, a channel messaging pane 1503, and an input box 1505.

The channel title pane 1501 may display the name of the channel. The channel messaging pane 1503 may display data associated with the group-based communication channel, including, for example, text, images, calendar summaries, event reminders (as described in detail further). The input box 1505 allows a user to input data (such as text and images) to the group-based communication channel. Data input by the user via the input box 1505 may be displayed in the channel messaging pane 1503.

As shown in FIG. 15, a user may click, tap, or otherwise select the channel title pane 1501, which may trigger the display of a user interface that shows details of the group-based communication channel. An example user interface is illustrated in FIG. 16.

Referring now to FIG. 16, an example user interface 1600 is shown. In particular, the user interface 1600 displays the details of a group-based communication channel, including a channel calendar rendering 1601. The channel calendar rendering 1601 may further include a "view all events" option 1603, allowing the user to trigger the display of events associated with the channel calendar 1601. Once the user clicks, taps, or otherwise selects the "view all events" option 1603, the server circuitry may cause the rendering of a user interface that displays events associated with the channel calendar. An example user interface is illustrated in FIG. 17.

As shown in FIG. 17, the user interface 1700 may include a today portion 1701, a this week portion 1703, and a this month portion 1705. The today portion 1701 may display events associated with the channel calendar that have time parameters showing event dates being the same as today's date. The this week portion 1703 may display events associated with the channel calendar that have time parameters showing event dates within this week. The this month portion 1705 may display events associated with the channel calendar that have time parameters showing event dates within this month.

Referring back to FIG. 17, a user may click, tap, or otherwise select one of the events on today portion 1701, this week portion 1703, or this month portion 1705. For example, the user may select the "JIRA Grooming and Planning" event 1707 in the today portion 1701, as shown in FIG. 17. After the user selects the "JIRA Grooming and Planning" event 1707, the server circuitry may cause the rendering of a user interface that displays details of the calendar event, as shown in FIG. 18.

Referring now to FIG. 18, example details of the "JIRA Grooming and Planning" event is shown in the user interface 1800. The example details may include, for example, the title of the event (based on the title parameter of the event object metadata set), the date of the event (based on the time parameter of the event object metadata set), and the location of the event (based on the location parameter of the event object metadata set).

The user interface 1800 may further include one or more buttons to allow the user to interact with the event. For example, the user interface 1800 may include a "join meeting" button 1801, allowing the user to join the event (for example, a video or audio conference) by clicking, tapping, or otherwise selecting the "join meeting" button 1801. The user interface 1800 may also include a "running late" button 1803 and a "decline" button 1805. The "running late" button 1803 may allow the user to provide an electronic notification to the group-based communication channel that he may not be able to join the meeting on time. For example, after the user clicks, taps, or otherwise selects the "running late" button 1803, the server circuitry may transmit an electronic message to the group-based communication channel, and the content of the electronic message shows that the user will be or is late for the meeting. As another example, once the user clicks, taps, or otherwise selects the "decline" button 1805, the server circuitry may generate an electronic message to the group-based communication channel, indicating that the user has declined to join the meeting.

In various embodiments of the present disclosure, a server circuitry (such as the group-based communication server 309 as shown in FIGS. 3 and 4) may generate one or more calendar summary messages to the group-based communication channel. Referring to FIGS. 19-21, example user interfaces associated with calendar summaries are shown. In particular, FIG. 19 illustrates an example user interface 1900 for configuring the calendar summaries, and FIGS. 20-21 illustrate example user interfaces 2000 and 2100 for displaying the calendar summaries.

Referring now to FIG. 19, a member of the group-based communication channel may access the user interface 1900 using a client device to configure the calendar summary messages. A server circuitry (such as the group-based communication server 309 as shown in FIGS. 3 and 4) may receive input from a client device to configure the calendar summary messages. A calendar summary message may provide a summary of upcoming events on the channel calendar. A calendar summary message may be configured to be transmitted to the group-based communication channel daily and/or weekly.

For daily summaries, the user interface 1900 allows the user to set the time for the server circuitry to transmit calendar summary messages. For example, the user interface 1900 as shown in FIG. 19 is configured for the server circuitry to transmit daily summaries every day at 9:00 am ET. Additionally or alternatively, an example user interface may allow the user to select which day(s) of the week that the server circuitry should transmit the summary messages (e.g. Monday through Friday).

In some examples, the server circuitry may determine that there is at least one event object associated with the channel calendar with time parameter showing today's date (for example, based on the network system time), and may transmit daily summary messages to the group-based communication channel on 9 am ET by default. In some examples, the server circuitry may determine that there is no event object associated with the channel calendar with time parameter showing today's date, and may not generate any daily summary message. In some examples, after determining that there is no event object associated with the channel calendar with time parameter showing today's date, the server circuitry may generate an electronic message to the group-based communication channel, showing that there is no event associated with the channel calendar for today (for example, "no team events for today").

For weekly summaries, the user interface 1900 allows the user to set the time and day of the week for the server circuitry to transmit calendar summary messages to the group-based communication channel.

In some embodiments, the server circuitry may determine the time zone(s) that members of the group-based communication channel reside in (for example, based on user profiles associated with members of the group-based communication channel). If members of the group-based communication channel reside in different time zones, the server circuitry may use the time zone associated with the first user who configured the calendar summaries (for example, via the user interface 1900) as the time zone for transmitting the calendar summary messages. In some embodiments, an example user interface may allow the user to set the time zone for transmitting the calendar summary message.

In some embodiments, the server circuitry may allow a user to remove one or more calendar or event from the daily summary. In this regard, an example user interface may provide an option for user to select or de-select one or more channel calendars or events for generating calendar summaries.

Referring now to FIGS. 20-21, example user interfaces 2000 and 2100 for displaying calendar summaries are illustrated.

As shown in user interface 2000, a calendar summary message 2001 may be rendered in a group-based communication channel. The calendar summary message 2001 may be displayed in the channel messaging pane 2003, and may provide a list view of upcoming events on the channel calendar.

When a user clicks, taps, or otherwise selects the calendar summary message 2001 to request "view in channel details" as shown in FIG. 20, the server circuitry may further cause the rendering of a channel calendar associated with the group-based communication channel, as shown in, for example, FIG. 21. In FIG. 21, the example user interface 2100 may include an "upcoming events" portion 2101, which may display one or more events corresponding to these in the list view as shown in the calendar summary message 2001 of FIG. 20.

In various embodiments of the present disclosure, a server circuitry may generate one or more event reminders to the group-based communication channel. Referring to FIGS. 22-24, example user interfaces associated with generating event reminders are shown. In particular, FIG. 22 illustrates an example user interface 2200 for configuring the event reminders, and FIGS. 23-24 illustrate example user interfaces 2300 and 2400 for displaying event reminders.

Referring now to FIG. 22, a member of the group-based communication channel may access the user interface 2200 using a client device to configure the event reminder message. As shown in FIG. 22, a server circuitry (such as the group-based communication server 309 as shown in FIGS. 3 and 4) may receive input from a channel member to configure the event reminder messages. An event reminder message may provide a reminder of upcoming event(s) on the channel calendar.

In some examples, an event reminder message may be configured to be transmitted to the group-based communication channel at a pre-determined time prior to the event starting time, or at a pre-determined time every day or every week. For example, as shown in FIG. 22, the user interface 2200 allows a user to configure the time at which the server circuitry transmits the event reminder to the group-based communication channel. The user interface 2200 may configure the server circuitry to transmit event reminder at, for example, 30 minutes before the event starting time, 15 minutes before the event starting time, 10 minutes before the event starting time, 5 minutes before the event starting time and/or at the event starting time. In some examples, the user interface 2200 may provide a default option of not transmitting event reminder message to the group-based communication channel.

In some embodiments, an example user interface may allow the user to configure the time zone for transmitting the event reminder message, similar to those described above in connection with the user interface for configuring calendar summary messages.

In some examples, the server circuitry may allow the configuration of event reminder on a per-calendar or per-event basis. In this regard, an example user interface may provide an option for user to select one or more calendars or events for generating event reminders.

Referring now to FIGS. 23-24, example user interfaces 2300 and 2400 for displaying event reminders are illustrated.

As shown in user interface 2300, an event reminder message 2301 may be posted to a group-based communication channel. The event reminder message 2301 may be displayed in the channel messaging pane 2303, and may provide a reminder of an upcoming event on the channel calendar.

When a user clicks, taps, or otherwise selects the event reminder message 2301, the server circuitry may further cause the rendering of details associated with the upcoming event, as shown in, for example, FIG. 24. In FIG. 24, the example user interface 2400 may provide example details of the upcoming event associated with the event reminder message 2301 of FIG. 23, and may further include one or more options for interact with the event, similar to the user interface 1800 described above in connection with FIG. 18.

Additional Implementation Details

Although example processing systems have been described in FIGS. 3-4, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer-readable storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer-readable storage medium can be, or be included in, a computer-readable storage device, a computer-readable storage substrate, a random or serial access memory array or device, or a combination of one or more of them. Moreover, while a computer-readable storage medium is not a propagated signal, a computer-readable storage medium can be a source or destination of computer program instructions encoded in an artificially-generated propagated signal. The computer-readable storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (Application Specific Integrated Circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory, a random access memory, or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a client device having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML (Hypertext Markup Language) page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any disclosures or of what may be claimed, but rather as description of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results, unless described otherwise. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results, unless described otherwise. In certain implementations, multitasking and parallel processing may be advantageous.

Conclusion

Many modifications and other embodiments of the disclosures set forth herein will come to mind to one skilled in the art to which these disclosures pertain having the benefit of the teachings presented in the foregoing description and the associated drawings. Therefore, it is to be understood that the disclosures are not to be limited to the specific embodiments disclosed and that modifications and other embodiments are intended to be included within the scope of the appended claims. Although specific terms are employed herein, they are used in a generic and descriptive sense only and not for purposes of limitation, unless described otherwise.

The invention claimed is:

1. An apparatus for rendering a calendar object in a user interface of a first client application associated with a group-based communication system, said group-based communication system supporting a plurality of members and comprising: a plurality of group-based communication system interfaces and a plurality of group-based communication channels accessible via each of the plurality of group-based communication system interfaces, said apparatus comprising:
    a processor and a non-transitory memory comprising program code, the non-transitory memory and the program code configured to, with the processor, cause the apparatus to at least:
    programmatically generate, by the first client application associated with the group-based communication system, a channel calendar identifier associated with a group-based communication channel of the plurality of group-based communication channels in the group-based communication system;
    receive a calendar sharing request associated with the channel calendar identifier,
    wherein the calendar sharing request comprises a request to access the calendar object from the group-based communication channel, and
    wherein the calendar object comprises a calendar object metadata set;
    in response to receiving the calendar sharing request, retrieve the calendar object and the calendar object metadata set;
    cause rendering of the calendar object for display via the first client application associated with the group-based communication channel of a client device;
    automatically update the user interface of the first client application to display the calendar object in a channel calendar pane based at least in part on the calendar object metadata set of the calendar object;
    wherein the client device is associated with a pre-shared calendar object in the group-based communication system, and the pre-shared calendar object is associated with a pre-shared event object,
    generate a sharing link corresponding to the pre-shared event object;
    receive, via the user interface of the first client application, an event sharing request associated with the sharing link; and
    cause rendering of the pre-shared event object for display via the user interface of the first client application associated with the group-based communication channel;
    generate a calendar summary message comprising a summary of upcoming calendar objects; and
    cause rendering of the calendar summary message for display via the first client application associated with the group-based communication channel of the client device.

2. The apparatus of claim 1, wherein the calendar object is retrieved from a calendar object repository associated with an external calendar resource, wherein the channel calendar identifier is a channel email address associated with the external calendar resource.

3. The apparatus of claim 2, wherein the non-transitory memory and the program code are configured to, with the processor, cause the apparatus to further:
  receive an event generation request comprising a request for an event object and an event object metadata set, wherein the event object metadata set comprises an attendee parameter, wherein the attendee parameter comprises the channel email address; and
  cause rendering of the event object for display via the user interface associated with the group-based communication channel.

4. The apparatus of claim 1, wherein prior to receiving the calendar sharing request, the non-transitory memory and the program code are configured to, with the processor, cause the apparatus to:
  generate a pre-shared calendar list, wherein the pre-shared calendar list comprises the pre-shared calendar object associated with the client device in the group-based communication system, wherein the calendar sharing request comprises an electronic selection of the pre-shared calendar object.

5. The apparatus of claim 1, wherein the pre-shared event object is a recurring event object, and wherein the sharing link comprises an electronic indication that the pre-shared event object is the recurring event object.

6. A computer-implemented method for rendering a calendar object in a user interface in a first client application associated with a group-based communication system, said group-based communication system supporting a plurality of members and comprising: a plurality of group-based communication system interfaces and a plurality of group-based communication channels accessible via each of the plurality of group-based communication system interfaces, said method comprising:
  generating a channel calendar identifier associated with a group-based communication channel of the plurality of group-based communication channels in the group-based communication system;
  receiving a calendar sharing request associated with the channel calendar identifier,
  wherein the calendar sharing request comprises a request to access the calendar object from the group-based communication channel, and
  wherein the calendar object comprises a calendar object metadata set;
  in response to receiving the calendar sharing request, retrieving the calendar object and the calendar object metadata set;
  causing rendering of the calendar object for display via the first client application associated with the group-based communication channel of a client device;
  automatically update the user interface of the first client application to display the calendar object in a channel calendar pane based at least in part on the calendar object metadata set of the calendar object;
  wherein the client device is associated with a pre-shared calendar object in the group-based communication system and, the pre-shared calendar object is associated with a pre-shared event object;
  generating a sharing link corresponding to the pre-shared event object;
  receiving, via the user interface of the first client application of the client device, an event sharing request associated with the sharing link; and
  causing rendering of the pre-shared event object for display via the user interface of the client device associated with the group-based communication channel;
  generating a calendar summary message comprising a summary of upcoming calendar objects; and
  causing rendering of the calendar summary message for display via the first client application associated with the group-based communication channel of the client device.

7. The computer-implemented method of claim 6, wherein the calendar object is retrieved from a calendar object repository associated with an external calendar resource, wherein the channel calendar identifier is a channel email address associated with the external calendar resource.

8. The computer-implemented method of claim 7, further comprising:
  receiving an event generation request comprising a request for an event object and an event object metadata set, wherein the event object metadata set comprises an attendee parameter, wherein the attendee parameter comprises the channel email address; and
  causing rendering of the event object for display via the user interface associated with the group-based communication channel.

9. The computer-implemented method of claim 6, wherein prior to receiving the calendar sharing request, the computer-implemented method further comprises:
  generating a pre-shared calendar list, wherein the pre-shared calendar list comprises the pre-shared calendar object associated with the client device in the group-based communication system, wherein the calendar sharing request comprises an electronic selection of the pre-shared calendar object.

10. The computer-implemented method of claim 6, wherein the pre-shared event object is a recurring event object, and wherein the sharing link comprises an electronic indication that the pre-shared event object is the recurring event object.

11. A computer program product for rendering a calendar object in a user interface of a first client application associated with a group-based communication system, said group-based communication system supporting a plurality of members and comprising: a plurality of group-based communication system interfaces and a plurality of group-based communication channels accessible via each of the plurality of group-based communication system interfaces, said computer program product comprising at least one non-transitory computer-readable storage medium having computer-readable program code portions stored therein, the computer-readable program code portions comprising an executable portion configured to:
  programmatically generate, by the first client application associated with the group-based communication system, a channel calendar identifier associated with a group-based communication channel of the plurality of group-based communication channels in the group-based communication system;
  receive a calendar sharing request associated with the channel calendar identifier,
  wherein the calendar sharing request comprises a request to access the calendar object from the group-based communication channel, and
  wherein the calendar object comprises a calendar object metadata set;

in response to receiving the calendar sharing request, retrieve the calendar object and the calendar object metadata set;

cause rendering of the calendar object for display via the first client application associated with the group-based communication channel of a client device;

automatically update the user interface of the first client application to display the calendar object in a channel calendar pane based at least in part on the calendar object metadata set of the calendar object;

wherein the client device is associated with a pre-shared calendar object in the group-based communication system and wherein the pre-shared calendar object is associated with a pre-shared event object;

generate a sharing link corresponding to the pre-shared event object;

receive, via the user interface of the client device, an event sharing request associated with the sharing link; and cause rendering of the pre-shared event object for display via the user interface of the client device associated with the group-based communication channel;

generate a calendar summary message comprising a summary of upcoming calendar objects; and cause rendering of the calendar summary message for display via the first client application associated with the group-based communication channel of the client device.

12. The computer program product of claim 11, wherein the calendar object is retrieved from a calendar object repository associated with an external calendar resource, wherein the channel calendar identifier is a channel email address associated with the external calendar resource.

13. The computer program product of claim 12, wherein the computer-readable program code portions comprise the executable portion configured to:
  receive an event generation request comprising a request for an event object and an event object metadata set, wherein the event object metadata set comprises an attendee parameter, wherein the attendee parameter comprises the channel email address; and
  cause rendering of the event object for display via the user interface associated with the group-based communication channel.

14. The computer program product of claim 11, wherein prior to receiving the calendar sharing request, the computer-readable program code portions comprise the executable portion configured to:
  generate a pre-shared calendar list, wherein the pre-shared calendar list comprises the pre-shared calendar object associated with the client device in the group-based communication system, wherein the calendar sharing request comprises an electronic selection of the pre-shared calendar object.

15. The apparatus of claim 1, wherein the non-transitory memory and the program code are configured to, with the processor, cause the apparatus to further:
  receive an event generation request comprising a request for an event object and an event object metadata set, and
  automatically generate at least one parameter for the event object metadata set based on at least one user identifier associated with the group-based communication channel or the channel calendar identifier associated with the group-based communication channel.

16. The computer-implemented method of claim 6, further comprising:
  receiving an event generation request comprising a request for an event object and an event object metadata set, and
  automatically generating at least one parameter for the event object metadata set based on at least one user identifier associated with the group-based communication channel or the channel calendar identifier associated with the group-based communication channel.

17. The computer program product of claim 11, wherein the computer-readable program code portions comprise the executable portion configured to:
  receive an event generation request comprising a request for an event object and an event object metadata set, and
  automatically generate at least one parameter for the event object metadata set based on at least one user identifier associated with the group-based communication channel or the channel calendar identifier associated with the group-based communication channel.

18. The apparatus of claim 15, wherein the calendar object metadata set comprises a privacy parameter and the event object metadata set comprises a visibility parameter, wherein the visibility parameter is independent from the privacy parameter.

19. The computer-implemented method of claim 16, wherein the calendar object metadata set comprises a privacy parameter and the event object metadata set comprises a visibility parameter, wherein the visibility parameter is independent from the privacy parameter.

20. The computer program product of claim 17, wherein the calendar object metadata set comprises a privacy parameter and the event object metadata set comprises a visibility parameter, wherein the visibility parameter is independent from the privacy parameter.

* * * * *